United States Patent
Hofstaedter et al.

(10) Patent No.: US 9,965,440 B2
(45) Date of Patent: May 8, 2018

(54) PUBLIC WIRELESS NETWORK PERFORMANCE MANAGEMENT SYSTEM WITH MOBILE DEVICE DATA COLLECTION AGENTS

(75) Inventors: Christian E. Hofstaedter, Hellertown, PA (US); Reyes Canales, III, Kirkland, WA (US); Edward Goziker, Redmond, WA (US); James S. Simpkins, Issaquah, WA (US); Fernando Garcia-Duarte, Seattle, WA (US); Julia Renouard, Shoreline, WA (US); Joseph T. Savarese, Edmonds, WA (US); Mark V. Kimmerly, Kirkland, WA (US); Zhenwu Wang, Seattle, WA (US); John Dangov, Seattle, WA (US); Paul L. Hoover, Seattle, WA (US); Michael L. Snyder, Seattle, WA (US)

(73) Assignee: NETMOTION WIRELESS HOLDINGS, INC., Seattle, WA (US)

( * ) Notice: Subject to any disclaimer, the term of this patent is extended or adjusted under 35 U.S.C. 154(b) by 0 days. days.

(21) Appl. No.: 13/561,536

(22) Filed: Jul. 30, 2012

(65) Prior Publication Data

US 2012/0289258 A1 Nov. 15, 2012

Related U.S. Application Data

(63) Continuation of application No. 13/017,751, filed on Jan. 31, 2011.

(60) Provisional application No. 61/300,291, filed on Feb. 1, 2010.

(51) Int. Cl.
*G06F 15/173* (2006.01)

(52) U.S. Cl.
CPC ................... *G06F 15/173* (2013.01)

(58) Field of Classification Search
CPC ........... H04L 12/5865; H04L 29/08072; H04L 29/06; H04L 43/00; H04W 4/02; H04W 4/025; H04W 4/04; G01S 5/00; H04M 1/72572; H04M 2207/18; H04M 3/42348; G06F 15/173
USPC ...... 340/1.1–6.1; 370/252; 709/224; 714/39, 714/47.1–47.3
See application file for complete search history.

(56) References Cited

U.S. PATENT DOCUMENTS

| | | |
|---|---|---|
| 6,193,152 B1 | 2/2001 | Fenando et al. |
| 6,198,920 B1 | 3/2001 | Doviak et al. |
| 6,347,340 B1 | 2/2002 | Coelho et al. |
| 6,418,324 B1 | 7/2002 | Doviak et al. |
| 6,826,405 B2 | 11/2004 | Doviak et al. |
| 6,981,047 B2 | 12/2005 | Hanson et al. |

(Continued)

OTHER PUBLICATIONS

Counterpart U.S. Appl. No. 13/548,903, filed Jul. 13, 2012.

(Continued)

*Primary Examiner* — Matthew Smithers
(74) *Attorney, Agent, or Firm* — Greenblum & Bernstein, P.L.C.

(57) ABSTRACT

Mobile device tracker and method for tracking movement of mobile devices within a mobile communications environment. The mobile device tracker includes an acquisition device to periodically acquire location data for the mobile device within the mobile communications environment, and a plotter to identify on a map of a geographical region within which the mobile communications environment is located the location data for the mobile device.

17 Claims, 19 Drawing Sheets

(56) References Cited

U.S. PATENT DOCUMENTS

| | | |
|---|---|---|
| 7,136,645 B2 | 11/2006 | Hanson et al. |
| 7,346,370 B2 | 3/2008 | Spaur et al. |
| 7,574,208 B2 | 8/2009 | Hanson et al. |
| 7,602,782 B2 | 10/2009 | Doviak et al. |
| 7,778,260 B2 | 8/2010 | Sturniolo et al. |
| 8,379,532 B2 * | 2/2013 | Griff .................. H04L 41/12 370/252 |
| 2001/0052087 A1 | 12/2001 | Garg et al. |
| 2002/0069037 A1 | 6/2002 | Hendrickson |
| 2002/0122394 A1 | 9/2002 | Whitmore et al. |
| 2003/0017845 A1 | 1/2003 | Doviak et al. |
| 2003/0065986 A1 | 4/2003 | Fraenkel et al. |
| 2003/0120811 A1 | 6/2003 | Hanson et al. |
| 2003/0182052 A1 * | 9/2003 | DeLorme ............... G01C 21/26 701/533 |
| 2004/1017018 | 9/2004 | Bogdon et al. |
| 2004/0203885 A1 * | 10/2004 | Quaid .................. H04W 64/00 455/456.1 |
| 2004/0203897 A1 * | 10/2004 | Rogers .................. H04W 16/18 455/456.1 |
| 2004/0264402 A9 | 12/2004 | Whitmore et al. |
| 2005/0002419 A1 | 1/2005 | Doviak et al. |
| 2005/0163047 A1 * | 7/2005 | McGregor ............ H04W 24/00 370/229 |
| 2005/0223114 A1 | 10/2005 | Hanson et al. |
| 2005/0223115 A1 | 10/2005 | Hanson et al. |
| 2005/0237982 A1 | 10/2005 | Pankajakshan et al. |
| 2006/0009213 A1 | 1/2006 | Sturniolo et al. |
| 2006/0023676 A1 | 2/2006 | Whitmore et al. |
| 2006/0030319 A1 | 2/2006 | Chou |
| 2006/0046716 A1 | 3/2006 | Hofstaedter et al. |
| 2006/0123014 A1 * | 6/2006 | Ng ................... G06F 17/30864 |
| 2006/0146825 A1 | 7/2006 | Hofstaedter et al. |
| 2006/0187956 A1 | 8/2006 | Doviak et al. |
| 2006/0203804 A1 | 9/2006 | Whitmore et al. |
| 2007/0112511 A1 * | 5/2007 | Burfeind et al. ............ 701/213 |
| 2007/0206591 A1 | 9/2007 | Doviak et al. |
| 2007/0296573 A1 * | 12/2007 | Schlesier ................ H04W 4/02 340/539.13 |
| 2008/0048856 A1 * | 2/2008 | Culpepper et al. ...... 340/539.13 |
| 2009/0083835 A1 | 3/2009 | Olson et al. |
| 2009/0157566 A1 * | 6/2009 | Grush .................. G01C 21/28 705/400 |
| 2009/0177801 A1 | 7/2009 | Chambers et al. |
| 2009/0307522 A1 | 12/2009 | Olson et al. |
| 2010/0046436 A1 | 2/2010 | Doviak et al. |
| 2011/0034179 A1 * | 2/2011 | David .................. G01S 5/0236 455/456.1 |
| 2011/0047594 A1 * | 2/2011 | Mahaffey ............. G06F 21/564 726/1 |
| 2011/0153208 A1 * | 6/2011 | Kruglick ............... G01C 21/20 701/533 |
| 2013/0196685 A1 * | 8/2013 | Griff .................... H04L 43/067 455/456.1 |

OTHER PUBLICATIONS

Counterpart U.S. Appl. No. 13/548,950, filed Jul. 13, 2012.
Counterpart U.S. Appl. No. 13/549,913, filed Jul. 16, 2012.
Counterpart U.S. Appl. No. 13/549,884, filed Jul. 16, 2012.
Counterpart U.S. Appl. No. 13/553,359, filed Jul. 19, 2012.
Counterpart U.S. Appl. No. 13/561,490, filed Jul. 30, 2012.
U.S. Office Action conducted in counterpart U.S. Appl. No. 13/017,751 dated Dec. 29, 2017.

* cited by examiner

```xml
<?xml version="1.0" encoding="UTF-8" ?>
<Configuration version="1.0">
  <Settings>
    <Setting id="CollectingEnabled" type="boolean">1</Setting>
    <Setting id="AnonymousMode" type="boolean">0</Setting>
    <Setting id="WwanReportingEnabled" type="boolean">1</Setting>
    <Setting id="LocationReportingEnabled" type="boolean">1</Setting>
    <Setting id="DisconnectedReportingEnabled" type="boolean">1</Setting>
    <Setting id="SampleFrequencySeconds" type="int">1</Setting>
    <Setting id="InactiveWwanSamplingEnabled" type="boolean">1</Setting>
    <Setting id="DouglasPoikerTolerance" type="int">2</Setting>
    <Setting id="MinimumHdop" type="int">7</Setting>
    <Setting id="GpsPreference" type="int">1</Setting>
    <Setting id="GpsPowerSave" type="boolean">0</Setting>
    <Setting id="MaxBufferSizeKb" type="int">2048</Setting>
    <Setting id="BufferFullAction" type="int">0</Setting>
    <Setting id="MinTransmitFrequencySeconds" type="int">5</Setting>
    <Setting id="BufferLocation" type="string"></Setting>
    <Setting id="ServerAddress" type="string">127.0.0.1</Setting>
    <Setting id="ServerPort" type="int">4430</Setting>
    <Setting id="UseSSL" type="boolean">0</Setting>
    <Setting id="GpsPort" type="string"></Setting>
    <Setting id="GpsPortBaud" type="int">0</Setting>
    <Setting id="GpsPortExplicit" type="boolean">0</Setting>
    <Setting id="GpsRescanTimer" type="int">300000</Setting>
    <Setting id="GpsPortOpenTimeout" type="int">5000</Setting>
    <Setting id="GpsPortReadTimeout" type="int">60000</Setting>
    <Setting id="GpsPortReOpenMaxTimeout" type="int">30000</Setting>
    <Setting id="GpsPortSharing" type="boolean">1</Setting>
    <Setting id="Load Sierra Support" type="boolean">1</Setting>
    <Setting id="Load Novatel Support" type="boolean">1</Setting>
    <Setting id="Load GOBI 1000 Support" type="boolean">1</Setting>
    <Setting id="Load GOBI 2000 Support" type="boolean">1</Setting>
    <Setting id="Load WMB Support" type="boolean">0</Setting>
    <Setting id="Load OPTION Support" type="boolean">1</Setting>
  </Settings>
</Configuration>
```

Figure 7

```
            <RulesEngine>
              <Actions>
90 ─────▶      <Action id=1,
                       name="Corporate Email",
                  retryInterval="30",
                  maxRetries="5",
                  type=SMTP>
                <Parameter id=1,
                           name="server"
                           type=string,
                           value="mercury.customer.com" />
                <Parameter id=2,
                           name="port"
                           type=ushort,
                           value="25" />
                <Parameter id=3,
                           name="to"
                           type=string,
                           value="locality.administrator@customer.com" />
                <Parameter id=4,
                           name="from"
                           type=string,
                           value="locality.system@customer.com" />
                <Parameter id=4,
                           name="subject"
                           type=string,
                           value="Locality Notification" />
92 ─────▶    </Action>
             </Actions>

<Predicates>
               <Predicate id=1,
                          type=UsingCarrierX>
                 <Parameter id=1,
                            name="CarrierName"
                            type=string,
                            value="Verizon" />
               </Predicate>
             </Predicates>
             <Conditions>

93 ─────▶      <Condition id=1,
                          type=PlanUsage>
                 <PredicateRefs>
                   <PredicateRef id="1" />
                 </PredicateRefs>
                 <Configuration>
                     <Parameter id=1,
                                name="StartDayOfMonth"
                                type=uint,
                                value=1,
                                units=days />
                     <Parameter id=2,
                                name="DataUsageLimit"
                                type=uint,
                                value=10,
                                units=MB />
```

Figure 10A

```xml
</Configuration>
    <State>
        <Parameter id=3,
            name="CurrentTimestamp",
            type=datetime,
            value="12:00:00.000 1/1/2010" />
        <Parameter id=4,
            name="CurrentUsage",
            type=uint,
            value="9"
            units=MB />
        <Parameter id=5,
            name="PredictedOverageTimestamp",
            type=datetime,
            value="12:00:00.000 1/10/2010" />
        <Parameter id=6,
            name="PredictedTotalUsage",
            type=uint,
            value="12"
            units=MB />
        <Parameter id=7,
            name="DeviceName",
            type=string,
            value="Joe B. OverPlan" />
        <Parameter id=8,
            name="EndCycleTimestamp",
            type=datetime,
            value="Joe B. OverPlan" />
    </State>
    </Condition>
</Conditions>
<Rules>
    <Rule id=1,
        Name="Predicted Data Plan Overage",
        Severity="Medium",
            Enabled="true">
        <ConditionRefs>
            <ConditionRef id=1 />
        </ConditionRefs>
        <ActionRefs>
            <ActionRef id=1>
                <Parameter id=4, value="Overage Predicated for {0}">
                    <SubstitutionParameter ordinal=1 conditionId=1
                                parameterId=7/>
                </Parameter>
            </ActionRef>
        </ActionRefs>
        <TriggerMessage text="The mobile device %1 is predicted to exceed the data
plan of %2 by %3. At this rate, they are predicted to use %4MB by the end of the
current plan cycle on %5">
            <SubstitutionParameter ordinal=1 conditionId=1 parameterId=7/>
            <SubstitutionParameter ordinal=2 conditionId=1 parameterId=2/>
            <SubstitutionParameter ordinal=3 conditionId=1 parameterId=5/>
            <SubstitutionParameter ordinal=4 conditionId=1 parameterId=6/>
            <SubstitutionParameter ordinal=5 conditionId=1 parameterId=8/>
        </TriggerMessage>
        <ResetMessage text="The mobile device %1 is predicted to be within the data
usage plan for the current billing cycle. At the current rate, they are predicted to
use %2MB by the end of the current plan cycle on %3">
            <SubstitutionParameter ordinal=1 conditionId=1 parameterId=7/>
            <SubstitutionParameter ordinal=2 conditionId=1 parameterId=6/>
            <SubstitutionParameter ordinal=3 conditionId=1 parameterId=8/>
        </ResetMessage>
    </Rule>
</Rules>
<RulesEngine>
```

| Business Problem | Condition |
| --- | --- |
| A Mobile Device cannot make a network connection | If a device has not communicated with the server in the past X minutes |
| An application is crashing on a Mobile Device | If application XYX on a device exits abnormally<br>If a device starts the same application more than X times in the past Y seconds |
| Which Mobile Device has what network interface device | If a device is using a WWAN card with a {driver\|firmware\|hardware} version less than some literal version |
| Which Network Interface Devices are under utilized | If a device or WWAN card has not been used in the past X days |
| Where are the coverage gaps | If more than X devices are within Y miles of each other and all RSSI levels are below Z<br>If more than X devices are within Y miles of each other and all have network error rates that are more than Z per minute |
| Keep network use within plan | If the data or minutes consumed exceed X over the past Y days<br>If the data or minutes consumed since last month's billing day are projected to exceed threshold in the current billing cycle |
| Prevent unplanned network costs associated with roaming | If more than X {data \| minutes} is consumed while roaming on a carrier that is not in the following list.<br>If a device roams to a carrier that is not in the following list |
| Ensure proper use of company resources | If a device starts an application that is not in the following list<br>If a device sends more than X data using an application that is not in the following list |
| Ensure the mobile workforce is where they need to be | If a device enters/leaves the following geographical area |
| Detect poor network quality | If the RSSI level exceeds a threshold for more than X seconds<br>If the errors or retries exceed a threshold for more than X seconds |

Figure 11

| Predicates |
| --- |
| For the following Users |
| For the following Devices |
| For the following Device Groups |
| For the following Phone Numbers |
| For Phone Numbers that match the following wildcard st |
| For the following Users |
| For devices {in | not in} the following geographical area |
| For WWAN cards or phones that are {on|not on} the following carriers |
| For WWAN cards or phones that are {capable | not capable} of {technology type} |
| For WWAN cards or phones that are {using | not using} {technology type} |
| For devices {in | not in} the following geographical area |
| For WWAN cards or phones that are {on|not on} the following carriers |
| During the following times of day |
| During the following days of the week |
| During the following absolute time range |
| During the past X {minutes | hours | days | weeks | months} |
| For WWAN cards or phones that have an RSSI {<|<=|>|>=|=|!=} X |
| For devices that are running the following applications/versions |
| For WWAN cards or phones with {model | driver| firmware | PRL} version = {value} |
| For devices running one of the following operating systems |
| During the past X {minutes | hours | days | weeks | months} |
| For devices running the following applications/versions |

Figure 12

| Action Name | Parameters | Description |
| --- | --- | --- |
| SMTP | Server ip/port, subject, to, from, message, attachments | Send an email |
| SNMP | Server ip/port, community string, OID | Send an SNMP Trap to a monitoring station |
| ModifySystem | Key, Value | Modify an operating system configuration value (ie the Windows Registry, configuration file, or a setting available in a standard API such as Windows WMI). |
| ModifyConfig | Key, value | Modify a configuration setting in the present invention. |
| ToggleRule | Rule id | Enable or disable a rule in the Artificial Intelligence engine of the present invention. |
| LaunchProcess | Path, image name, parameters | Launch a process on the current operating system with the specified parameters. |

Figure 13

PUBLIC WIRELESS NETWORK PERFORMANCE MANAGEMENT SYSTEM WITH MOBILE DEVICE DATA COLLECTION AGENTS

CROSS REFERENCE TO RELATED APPLICATIONS

The present application is a Continuation of U.S. application Ser. No. 13/017,751 filed Jan. 31, 2011 and claims the benefit of U.S. Provisional Patent Application No. 61/300,291 filed on Feb. 1, 2010. The disclosures of both above-noted documents are expressly incorporated by reference herein in their entireties.

BACKGROUND OF THE INVENTION

1. Field of the Invention

The present invention relates to the field of wireless communications. More particularly, the present invention relates to the combined practices of Network Performance Management and Mobile Device Management. Even more particularly, the present invention relates to one or more mobile hosts monitoring one or more data measurements of one or more public wireless networks from one or more terminal nodes of a network, locally storing the collected data, processing the data through an artificial intelligence engine, and periodically communicating the collected data back to a centralized data collection server where it may again be processed through an artificial intelligence engine and stored into a database so it can be viewed with a graphical and analytical front-end user interface.

2. Discussion of Background Information

Within the last two decades, wireless networks and the surrounding ecosystem of mobile computing products have been steadily gaining in market adoption. The promises of wireless adoption include high return on investment, increased mobile worker productivity, ubiquitous public wide area networks, high network speed, and high network security. In many cases, these promises have been realized. However, in many other cases, the value gained from wireless adoption has fallen short of expectations.

For many enterprises, deployment of mobile solutions and adoption of public wireless networks have included problems such as unexpected overages and fees, dropped calls, lost connections, intermittent coverage, lower than anticipated bandwidth per mobile worker, and variations in network trust. In addition, current trends in public wireless network supply versus demand are expected to drive the elimination of unlimited pricing plans in favor of tiered pricing plans with specified usage limits. These trends will serve to exacerbate the pain currently felt by enterprises trying to manage and control expenses related to their mobile workforce. In addition, with the increased adoption of wireless networks and an increasingly mobile workforce, as well as trends in mobile broadband technology development, enterprises have found that mobile assets are fundamentally more difficult to manage than fixed assets.

Historically, enterprises have turned to network performance management tools to help control the problems listed above. Unfortunately, most existing products in the marketplace were designed for wired networks and for wireless networks that are fully controlled by the enterprise (i.e. private WiFi among others).

Most of the existing products in the marketplace gather performance data on the networks using data collection agents in the network infrastructure (i.e. routers, switches, among others). When the infrastructure is inaccessible to the enterprise, because the network is public, these tools do not work. In addition, many of the existing products in the marketplace communicate collected data back to a central server using standard protocols such as Simple Network Management Protocol (SNMP) or Netflow. While these protocols work well on traditional wired networks, they are chatty, inefficient, and result in inflated network usage costs when used on public wireless networks.

In addition standard systems developed for wired networks rely on snap shots of data being available to build historical knowledge of how a systems state varies over time. For example, Simple Network Management Protocol (SNMP) will continually poll a device for network statistics taking a temporal snap shot of the state of the Transmission Control Protocol (TCP) stack at the instant of each poll. This snapshot of data is then stored on a server for future analysis. These standards based management systems have gaps in knowledge created by intermittent connectivity when running over wireless networks due to regions of low signal and connectivity errors. If a mobile device is unable to connect when a sample is requested by an SNMP management system the mobile device's state at that instant and location is lost forever and cannot be used for future analysis.

Another example demonstrating the limitations in the current state of the art for network management systems is RFC 3954 Cisco Systems NetFlow Services Export Version 9, and in particular to section "3.3—Transport Protocol." The disclosure of RFC 3954 is expressly incorporated by reference herein in its entirety. The system is designed without regard for congestion—let alone intermittent connectivity. RFC 3954 recommends a dedicated link from the data collection agent to the server specifically to avoid solving the congestion or intermittent connectivity problems. This type of system obviously cannot allow an enterprise to manage their use of public wireless networks.

Also, the performance characteristics of wireless networks are unique from wired networks in that they vary over space and time. Two points, separated by space, can and often will experience differing levels of network quality on a wireless network. Further, measurements of network quality on a wireless network for a single point in space but with measurements separated in time often vary as well. Traditional network performance management systems do not collect Geographical/Geospatial Information System (GIS) location as the data collection agents are deployed to network infrastructure hosts that are fixed in space. Traditional systems do not account for network measurements collected over time and correlated to a dynamic GIS location.

Therefore, a need exists for enterprises to collect data about devices using public wireless networks and the network performance that the device experienced over time correlated to device GIS location so that enterprises can determine problematic devices and so that enterprises can determine problematic areas of the public wireless network. Additionally a method is needed to maintain the historical knowledge of how a device's state (location, packet counts, signal strength, running applications, processes, errors etc) changes over time even when the device is in areas of poor signal strength preventing a good connection or simply is intermittently connected to a network so that historical trends can be monitored without loss of information. Additionally, a need exists to collect data about devices using public wireless networks and their network usage levels over time and location so that enterprises can control costs associated with excess usage or costs associated with under-used devices. Additionally, a need exists to collect data about highly mobile devices equipment inventories and usage patterns so that enterprises can better manage mobile assets. Additionally, a need exists to minimize bandwidth requirements of transmitting collected data to a central server so as to minimize usage cost overhead of doing so. Additionally, a need exists to facilitate analysis of the collected data to ease the burden of the above mentioned problems by making all collected data accessible in a graphical front end reporting system that provides GIS map and chart based visualizations of the correlations among the collected data.

SUMMARY OF THE INVENTION

In view of the foregoing, an aspect of the present invention is directed to provide for a network performance management system with data collection agents in the terminal nodes of the network.

Embodiments of the invention are directed to a wireless network performance management system that includes at least one collection agent for collecting data related to at least one of service coverage; service quality; and usage of public and/or private data networks for enterprise clients; and a reporting unit to graphically represent the collected data to at least one of track, troubleshoot, and analyze the one of the service coverage; the service quality; and the usage of public and/or private data networks for the enterprise clients.

According to an aspect of the present invention, data collection agents reside on Mobile Devices that represent the terminal nodes of the network.

According to another aspect of the present invention, data collection agents are capable of dynamically discovering active network interfaces for wireless networks accessible to the Mobile Device.

According to another aspect of the present invention, data collection agents are capable of dynamically discovering active GPS interfaces on the Mobile Device.

According to another aspect of the present invention, data collection agents are capable of collecting data against multiple networks simultaneously with the multiple interfaces to similar networks (bandwidth aggregation) or to dissimilar networks (roaming).

According to another aspect of the present invention, data collection agents are capable of continuing to collect data even when the Mobile Device is not connected to a network or is only intermittently connected to a network.

According to another aspect of the present invention, data collection agents are resilient to network unreliability and congestion through the use of persistent buffering on the Mobile Device on which the data collection agent resides.

According to another aspect of the present invention, data is collected that pertains to the Mobile Device including device name, device manufacturer, operating system version, and logged in user name, among others.

According to another aspect of the present invention, data is collected that pertains to the applications and processes running on a Mobile Device including start times, end times, process ids, executable names, network flows created by the process, security contexts, protocols used, ports used, interfaces used, and IP addresses, among others.

According to another aspect of the present invention, data is collected that pertains to specific network interface devices and the activity occurring on each including name, manufacture, hardware version, firmware version, driver version, phone number, maximum technology capability, technology used, home carrier, active carrier, cell tower ID, signal strength, transport layer retries, MTU sizes, packet loss, latency and jitter, and efficiency, among others.

According to another aspect of the present invention, location of a mobile device over time is collected.

According to another aspect of the present invention, all other collected data is correlated to both time and the location of the mobile device.

According to another aspect of the present invention, data collection agents are capable of varying the rate of data collection in relation to the velocity of the mobile device for the purpose of achieving a more uniform geographic data distribution According to another aspect of the present invention, data collection agents are capable of compressing data element values over time, such as signal strength among others, using the Douglas-Peucker reduction algorithm.

According to another aspect of the present invention, an anonymous reporting mode is provided by which all information that could be used to identify a user are removed from the data collection and reporting. This would include but is not limited to device name, user name, phone number, location etc.

According to another aspect of the present invention, an artificial intelligence engine is provided that is capable of monitoring environmental conditions, data collection instant values and data collection trends, evaluating the monitored values against configured rules, and triggering certain actions when the evaluated rules indicate to do so.

According to another aspect of the present invention, an artificial intelligence engine can operate on the Mobile Device, on the Server, or on both.

According to another aspect of the present invention, a method is provided to configure artificial intelligence engine rules with billing period time-ranges, usage limits, and notification email address so as to provide automatic email warnings when usage limits are projected to be exceeded.

According to another aspect of the present invention, a method is provided to configure artificial intelligence engine rules with billing period time-ranges and usage limits so as to provide automatic disabling of network interfaces to prevent usage and cost overages.

According to another aspect of the present invention, a method is provided to configure artificial intelligence engine rules to inform the user that is in a region of poor coverage the nearest region of good network coverage so the user can relocate for the purpose of continuing network communications.

According to another aspect of the present invention, a method is provided for a graphical reporting user interface that provides various reports based on the data collected by the data collection agents.

According to another aspect of the present invention, a report is provided that correlates device characteristics with network characteristics over time and location for the purpose of auditing public network billing statements, identifying and managing over-used, under-used, and problematic devices, and to troubleshoot performance problems occurring in the networks.

According to another aspect of the present invention, a report is provided on the applications and processes in use on a Mobile Device.

According to another aspect of the present invention, a report is provided on the percentage of total network usage caused by specific applications, processes, and users.

According to another aspect of the present invention, a report is provided on application transaction time as they vary over time, location, cell tower, carrier, phone number, modem manufacture, device manufacture, device driver version etc to identify reasons for variations in performance.

According to another aspect of the present invention, a report is provided on application performance such as application bytes sent and received as they vary over time, location, cell tower, carrier, phone number, modem manufacture, device manufacture, device driver version etc to identify reasons for variations in performance.

According to another aspect of the present invention, a report is provided on the security account used to launch applications and processes.

According to another aspect of the present invention, a report is provided on the list of flows created by applications and processes.

According to another aspect of the present invention, a report is provided on what protocols, ports, interfaces, IP addresses, and networks are used by specific applications as they vary over time, location, carrier, cell tower.

According to another aspect of the present invention, a report is provided on all transport layer packets and tracking the state of each TCP connection including protocol state, window size, TCP options, timestamp options, selective acknowledgment (SACK) metrics, minimum, maximum, average, and standard deviation of round trip times, retries, total bytes sent and received as they vary over time, location, cell tower, carrier, phone number, modem manufacture, device manufacture, device driver version etc to identify reasons for variations in performance.

According to another aspect of the present invention, a report is provided tracing a device route over time overlaid on top of mapping software while indicating the variations in signal strength, technology type, error rates, transport layer performance, network layer performance and application layer performance.

According to another aspect of the present invention, a report is provided replaying a device route over time overlaid on top of mapping software while indicating the variations in signal strength, technology type, error rates, transport layer performance, network layer performance and application layer performance.

According to another aspect of the present invention, a report is provided that can be configured with billing period time-ranges so as to provide appropriate usage and cost projections.

According to another aspect of the present invention, a report is provided that predicts roaming charges as indicated by device total bytes sent and received while doing international roaming.

According to another aspect of the present invention, a report is provided that distinguishes between non billable roaming and billable roaming.

According to another aspect of the present invention, a report is provided that indicates home network and partner networks visited by location.

According to another aspect of the present invention, a report is provided that indicates visited cell towers.

According to another aspect of the present invention, a report is provided and score cards for comparing performance of different carriers by time, location, modem manufacture, device manufacture, device driver version, OS types, OS version, protocol type such as IPv4 or IPv6, and VPN type.

According to another aspect of the present invention, a report is provided on memory consumption, CPU, semaphores, locks and other operating system resources.

According to another aspect of the present invention, a report is provided showing location usage densities by geographic regions to report number of users, devices, and byte counts by location.

According to another aspect of the present invention, a report is provided by protocols, such as the internet protocol version in use, e.g., IPv4 or IPv6, by location, time and carrier.

According to another aspect of the present invention, a report is provided that will list the nearest N users in the devices network by location for the purpose of knowing who is nearby to assist the user when needed.

Embodiments of the invention are directed to a method that includes collecting data related to at least one of service coverage; service quality; and usage of public and/or private data networks for enterprise clients, and graphically displaying the collected data to at least one of track, troubleshoot, and analyze the one of the service coverage; the service quality; and the usage of public and/or private data networks for the enterprise clients.

Embodiments of the instant invention are directed to a mobile device tracker for tracking movement of mobile devices within a mobile communications environment. The mobile device tracker includes an acquisition device to periodically acquire location data for the mobile device within the mobile communications environment, and a plotter to identify on a map of a geographical region within which the mobile communications environment is located the location data for the mobile device.

In embodiments, the acquisition device can further acquire with the location data a time at which the location data was generated, and the plotter may be structured to additionally plot on the map indicia to connect the location data in chronological order. The indicia can include arrows.

According to embodiments, the location data may relate to a location of an attachment point for the mobile user in the mobile communications network.

In accordance with other embodiments, the mobile communications environment may include at least one of a public and a private mobile network. Further, regardless of the network to which the mobile user is connected, the acquisition device may receive the location data for the attachment point to which the mobile user is connected.

According to still other embodiments of the invention, the acquisition device can acquire the location data from the mobile user. The acquisition device can automatically receive the location data from the mobile user.

Embodiments of the invention are directed to a method for tracking movement of mobile devices within a mobile communications environment. The method includes periodically acquiring location data for the mobile device within the mobile communications environment, and plotting on a map of a geographical region within which the mobile communications environment the location data for the mobile device.

According to embodiments of the invention, the method can include acquiring with the location data a time at which the location data was generated, and plotting on the map indicia to connect the location data in chronological order. The indicia can include arrows.

In accordance with other embodiments, the mobile communications environment may include at least one of a public and a private mobile network. Further, the method can include, regardless of the network to which the mobile user is connected, receiving the location data for the attachment point to which the mobile user is connected.

According to further embodiments, the method can also include acquiring the location data from the mobile user. The method may further include automatically receiving the location data from the mobile user.

Embodiments of the invention are directed to a mobile device tracker for tracking movement of mobile devices within a mobile communications environment comprising at least one available network. The mobile device tracker includes an acquisition device to periodically acquire location data from mobile devices over time, a storage device for storing the location data for each mobile device and a time at which the location data was generated, and a mapping device that populates, for a specified mobile device, maps of a geographical region within which the mobile communications environment is located with the location data and the generation time.

In accordance with still yet other embodiments of the present invention, the tracker can further include a plotter that provides indicia on the map indicative of a chronological order of the received location data. The indicia may be arrows.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7 illustrates an exemplary configuration file, according to an aspect of the present invention;

FIGS. 10A and 10B illustrate an exemplary configuration file for configuring the rules that drive the artificial intelligence engine;

FIG. 11 illustrates, in one exemplary embodiment, a table of conditions for artificial intelligence rules, with associated business problems that the conditions may help to address;

FIG. 12 illustrates, in one exemplary embodiment, a list of predicates that can qualify conditions used in artificial intelligence rules;

FIG. 13 illustrates, in one exemplary embodiment, a list of actions that can be taken when a configured set of predicates and conditions evaluate to true while the Artificial Intelligence engine processes a rule;

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
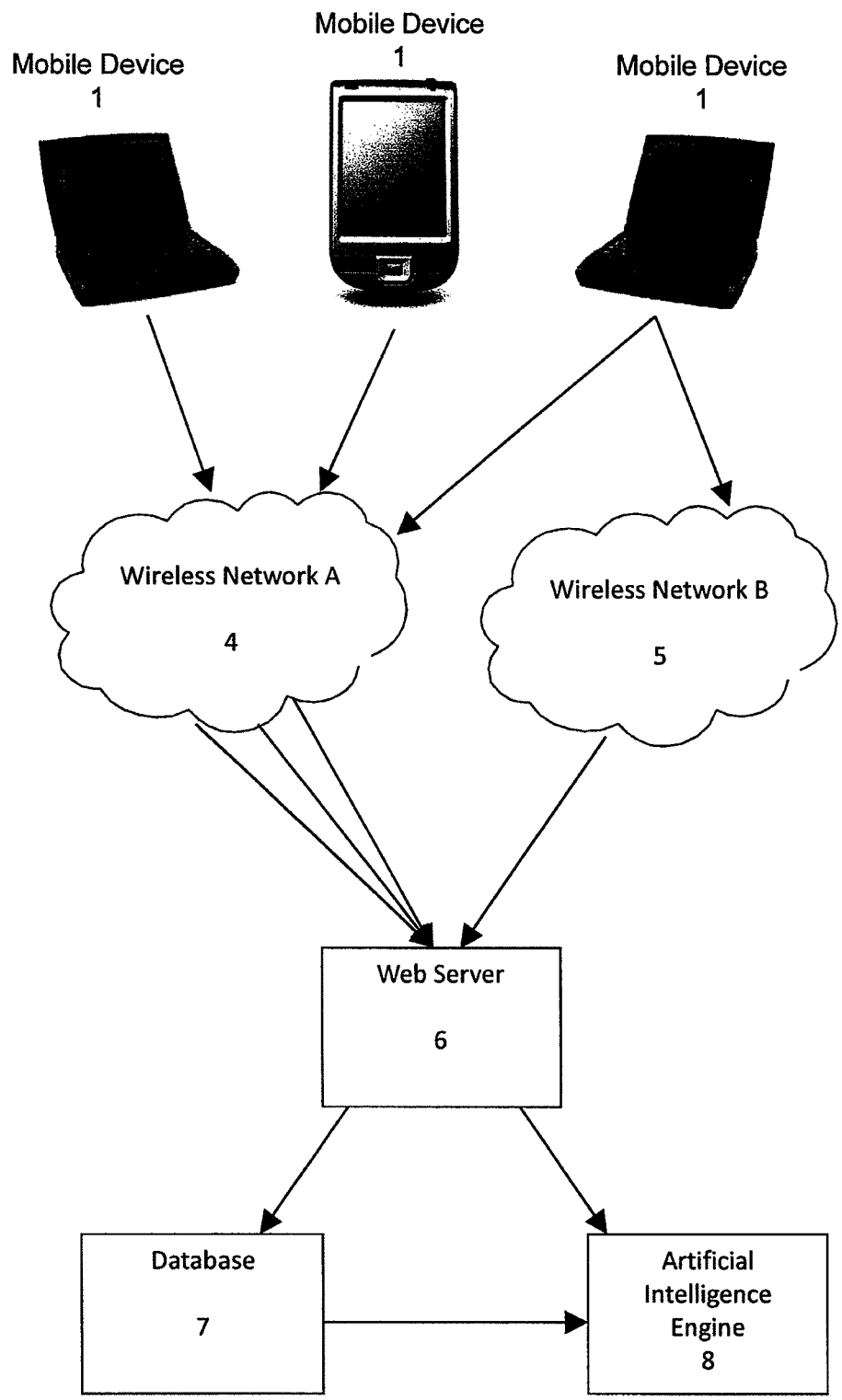
FIG. 1 illustrates a block diagram of the various components of the present invention.

The present invention is a distributed network performance management system. As such, it is composed of data collection agents located on the terminal nodes of the system and a central server comprised of a web server, a database, and an artificial intelligence engine 8. FIG. 1 shows an overall system component diagram with Mobile Devices 1 on which the data collection agents reside, Wireless Networks 4, 5 of which multiple networks may be simultaneously in use, a Web Server 6 that both receives collected data and provides access to the reports based on that data, a Database 7 that provides the historical data storage for the system, and an Artificial Intelligence Engine 8 that receives incoming data from the Mobile Devices 1 and reads historical data from the Database 7 to evaluate rules and take actions as warranted.

By way of example, Mobile Devices 1 can include laptops, netbooks, smartphones, handheld devices, workstations, PDAs, IPADs, tablet computers, etc. Further, wireless networks 4, 5 can include WiFi, cellular networks technologies such as WiMax, 3G, 4G and Long Term Evolution (LTE), as well as other radio networks. Web server 6 can include Internet Information Service (IIS), APACHE TOM- CAT, ORACLE HTTP Server and others. Database 7 can include MySQL, SQL Server, dBASE, MICROSOFT ACCESS, etc. Artificial Intelligence Engine 8 can include automatic system-generated notifications and alerts, policy enforcement, conditional system responses based on the nature and content of collected information.

The primary advantage to a distributed network performance management system with data collection agents located on the terminal nodes of the network is the ability to perform measurements on public networks that are neither owned nor controlled by the party operating the performance management system. The data collection agents can include software drivers, software agents, firmware, or embedded hardware (or combinations thereof) in the mobile devices. In addition, since the Mobile Devices 1, which make up most of the terminal nodes of public wireless networks, often make use of multiple public wireless networks, the current invention is capable of monitoring the performance of multiple networks simultaneously. Further, the Mobile Devices 1 using public wireless networks are generally moving through space thereby making location a data measurement that, when correlated to other network performance measures, offers unique advantages to enterprises wishing to monitor the performance of their mobile workforce.

Figure 2:
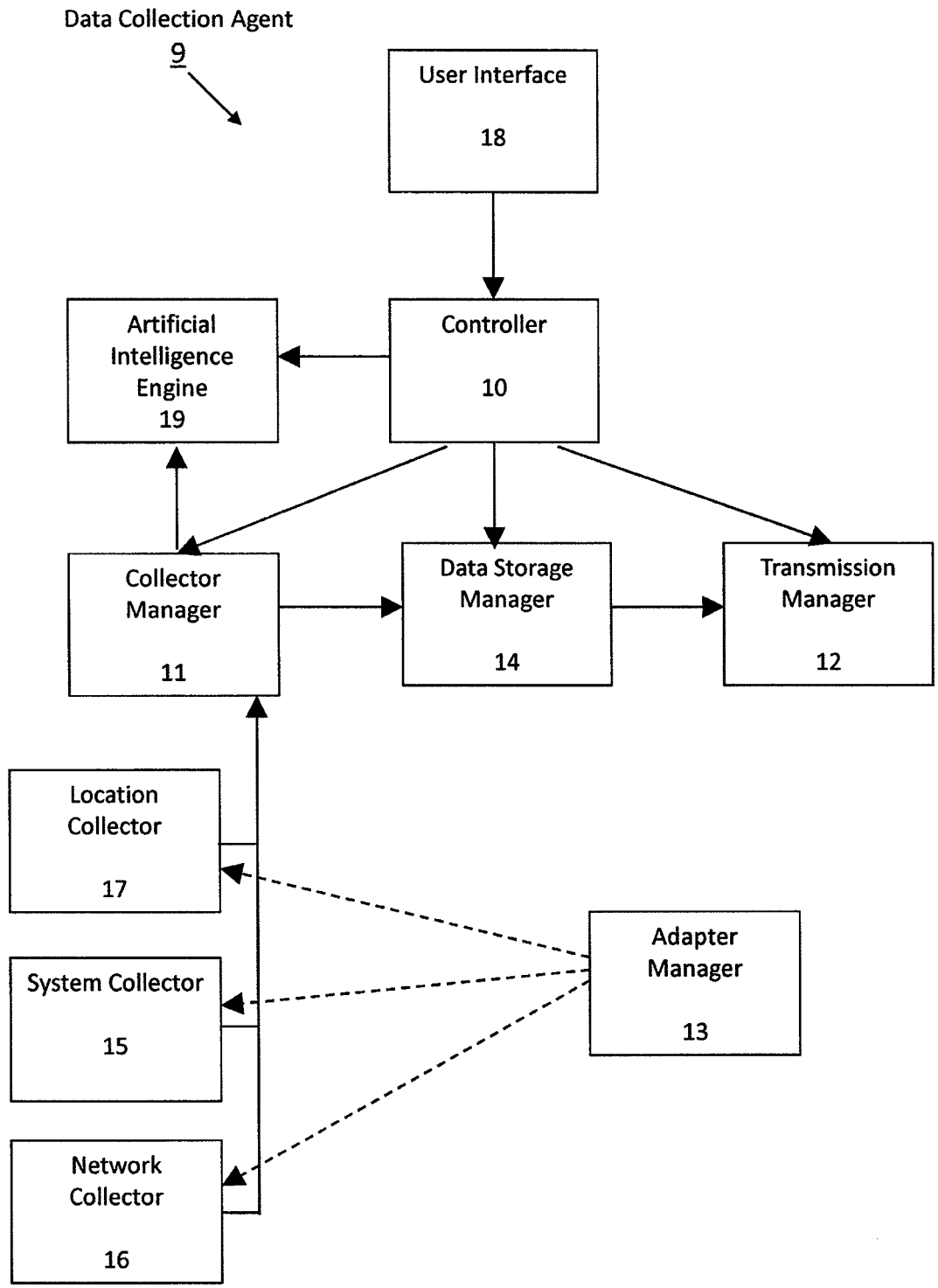
FIG. 2 illustrates a block diagram of the data collection agent component of the present invention.

Terminal nodes of the mobile network are where the data collection agents are located. FIG. 2 shows a block diagram of an exemplary embodiment of a data collection agent 9 in the present invention. In FIG. 2, the Controller 10 coordinates the actions of all of the other entities in Data Collection agent 9, which as noted above, can be formed or implemented in hardware, software and/or firmware or an any combinations thereof. The Controller 10 is the entity that receives and processes commands from the User Interface 18. By way of non-limiting example, the User Interface 18 may be a graphical user interface on a WINDOWS machine, LINUX machine, MAC OS machine, text file, web interface or serial port, or the User Interface 18 may be a configuration file stored in a database in Mobile Device 1 or encrypted in a secure file and accessible from locations such as a secure server, another device, or a web-based interface. By way of non-limiting example, the User Interface 18 may send commands that get or set configuration, start or stop the data collection agent, view the current operational status of the various data collectors (network, system, location) and their most recently collected data, and retrieve debugging information among other possible commands.

In FIG. 2, the Controller 10 creates and controls the Collector Manager 11, the Data Storage Manager 14, the Transmission Manager 12, and the Adapter Manager 13.

The Collector Manager 11 is responsible for controlling each of the individual collectors including the Location Collector 17, the System Collector 15, and each of the Network Collectors 16. The Collector Manager 11 creates both the Location Data Collector 17 and the System Collector 15, which run for the lifetime of data collection agent 9. A network Collector 16 is created by the Adapter Manager 13 for each network interface created for a detected available network for Mobile Device 1 and then provided to the Collector Manager 11. The Collector Manager 11 is responsible for periodically retrieving collected data from each of the collectors, formatting that data, and storing it in the Data Storage Manager 14.

The System Collector 15 is responsible for collecting all system data from the Mobile Device 1. System data includes all data that is not specific to either location of the Mobile Device 1 or to a particular network interface. By way of non-limiting example, the System Collector 15 may collect information pertaining to the applications and processes running on a Mobile Device 1, network connection and flows associated with the applications and processes running on a Mobile Device 1, the security principal associated with the applications and presses running on a Mobile Device 1, the network transaction time associated with flows that are associated with the applications and processes running on a Mobile Device 1, the protocol state, window size, TCP options, timestamp options, SACK metrics, minimum, maximum, average, and standard deviation of round trip times, retries, total bytes sent and received, the protocol type (such as, e.g., IPv4 or IPv6 or future generations thereof) for flows associated with applications or processes running on the Mobile Device 1, the OS type and version running on the Mobile Device 1, the virtual private network (VPN) type and version running on the Mobile Device 1, and the memory consumption, CPU, semaphores, locks and other operating system resources that are available and in-use on the Mobile Device 1.

Most modern operating systems, e.g., WINDOWS, ANDROID, LINUX, IOS, OSX as well as embedded Reduced Instruction Set Computing (RISC) systems used in automobiles, appliances and interactive telematics services such as ONSTAR and FLEETMATICS, could be used to access the information that the System Collector 15 provides. For example, the WINDOWS operating systems provide full support and documentation for the WINDOWS Filtering Platform. This platform can be used to acquire much of the information required by the System Collector 17. Similar frameworks exist on other modern operating systems.

The Location Collector 17 is responsible for finding a global positioning system (GPS) device embedded within or attached to the mobile device by scanning all available serial ports. Then, using serial port sharing technology, well-known by those practiced in the arts using such standard knowledge as exists in products offered by ELTIMA and FABULATECH, the Location Collector 17 will retrieve incoming GPS data over the serial port and report it for correlation with all other data returned by all other collectors. This position information is reported to Web Server 6 for insertion into Database 7 for display and/or further analysis. The position information can also be forwarded to Artificial Intelligence Engine 8 for analysis and reporting additional information & conclusions, and taking action to report and inform potential users of this information. The manner of correlating the GPS and other data is by time and device, along with other device-specific and network-specific information that is collected.

The Network Collector 16 is responsible for collecting data specific to a particular network interface. While the exemplary embodiments of the invention are directed to wide area networks, it is understood that other type networks can also be utilized without departing from the spirit and scope of the embodiments of the invention. In this regard, it is understood that the Network Collector concept described in this application could be expanded by those ordinarily skilled in the art to include other network types, such as, by way of non-limiting example, LAN and WLAN networks, cellular networks, satellite networks, WiFi, WiMax, etc. without departing from the spirit and scope of the embodiments. Often, the Network Collector will make use of Software Developer Kit (SDK) libraries, provided by networking device manufacturers, to access the information it requires. Sometimes however, the information is available through standard devices in the platform operating system.

One example of a standard devices provided by the operating system is the example given above about the Windows Filtering Platform. Given a choice of equally accurate data, embodiments of the present invention may preferably use standard mechanisms in the platform operating system. Alternatively, advantageous results can also be achieved through the use of vendor SDK's. The Network Collector 16 collects information such as cell tower, phone number, modem manufacture, device manufacture, device driver version, firmware version, maximum technology capability, active technology type, roaming status, home network carrier, active network carrier, signal strength, transport layer retries, MTU sizes, packet loss, latency, jitter, efficiency, as well as bytes and packets sent and received over the network by the Mobile Device 1. Then the Data Storage Manager 14 and the Transmission Manager 12 stores, and transmits the information at specified intervals. As noted above, network collector 16 is created for each network available to mobile device 1. In an exemplary embodiment, Network Collector 16 can be, e.g., a WAN Collector that collects data for an available WAN network. Additionally or alternatively, a Network Collector 16 can also be created as a WiFi Collector and/or another Mobile Network Technology Collector providing similar functionality for those network types and/or other WAN Collectors for other available WAN networks.

For some user groups, the amount of information collected may be considered too much. Specifically, such user groups may have privacy concerns with the amount of data collected. For such user groups, the present invention provides for "Anonymous Mode" data collection. In this mode of data collection, the collection of all data that could be used to identify the user of the Mobile Device 1 that is collecting the data can be disabled. By way of non-limiting example, such data may include username, machine name, VPN IP Address, and location, among others. In many cases, these user groups may want more control over when "Anonymous Mode" is enabled. For these user groups, "Anonymous Mode" may be enabled/disabled for individual devices or for groups of devices based on time-of-day ranges, day-of-week ranges, and days-of-the-month ranges.

The Data Storage Manager 14 is responsible for maintaining a fast, persistent, and low-overhead data queue. It receives and stores collected data from the Collector Manager 11. The data is stored in a FIFO (first-in-first-out) or "queue" format. When requested by the Transmission Manager 12, the Data Storage Manager 14 provides stored data to the Transmission Manager 12 so that the data can be sent to the Web Server 6. The Data Storage Manager 14 provides this information in a transactional manner. If the Transmission Manager 12 fails to successfully send the data to the Web Server 6, then the stored data won't be removed from the Data Storage Manager 14. But if the Transmission Manager 12 does successfully send the data to the Web Server 6, then the stored data will be removed from the Data Storage Manager 14. In addition, the Data Storage Manager 14 will maintain limits on the amount of data it will store. In one exemplary embodiment, the limits on data storage capacity are configurable. There are various ways in which the storage limit may be enforced including, by way of non-limiting example discarding the newest collected data or discarding the oldest collected data. In one exemplary embodiment, the data discard policy is configurable.

The Transmission Manager 12 is responsible for transmitting collected data from the Data Storage Manager 14 to the Web Server 6 at appropriate times. The Transmission Manager 12 maintains a minimum transmit frequency. In an exemplary embodiment, the minimum transmit frequency is configurable. If there is data to send and the minimum transmit frequency has elapsed since the last transmission, the Transmission Manager 12 will attempt to send the data to the Web Server 6. The Web Server 6 will return a positive acknowledgement to the Transmission Manager 12 after it has stored all transmitted data thereby ensuring no data loss. All data sent by the Transmission Manager 12 is compressed by the Transmission Manager 12 and decompressed by the Web Server 6 using an industry standard compression algorithm. By way of non-limiting example, the compression and decompression algorithms may be similar to that which is described by RFC 1950, the disclosure of which is expressly incorporated by reference herein in its entirety.

The Adapter Manager 13 is responsible for monitoring the networking interfaces that are available on the Mobile Device 1. When the Adapter Manager 13 identifies that a network interface has become available, it creates a new instance of a Network Collector 16 and provides that instance to the Collector Manager 11 so that the Collector Manager 11 can periodically retrieve collected data from it to be stored and forwarded to both the Data Storage Manager 14 and the Artificial Intelligence Engine 19. When the Adapter Manager 13 identifies that an existing network interface has become unavailable, it removes the associated Network Collector 16 from the Collector Manager 11 and destroys it.

The Artificial Intelligence Engine 19 is fundamentally the same entity as the Artificial Intelligence Engine 8 in FIG. 1. The main difference between these two entities is that artificial intelligence engine 8 in FIG. 1 resides on the server and the artificial intelligence engine 19 in FIG. 2 resides in the data collection agent 9 in the Mobile Device 1. The Artificial Intelligence Engine 8, 19 is discussed later.

Figure 3:
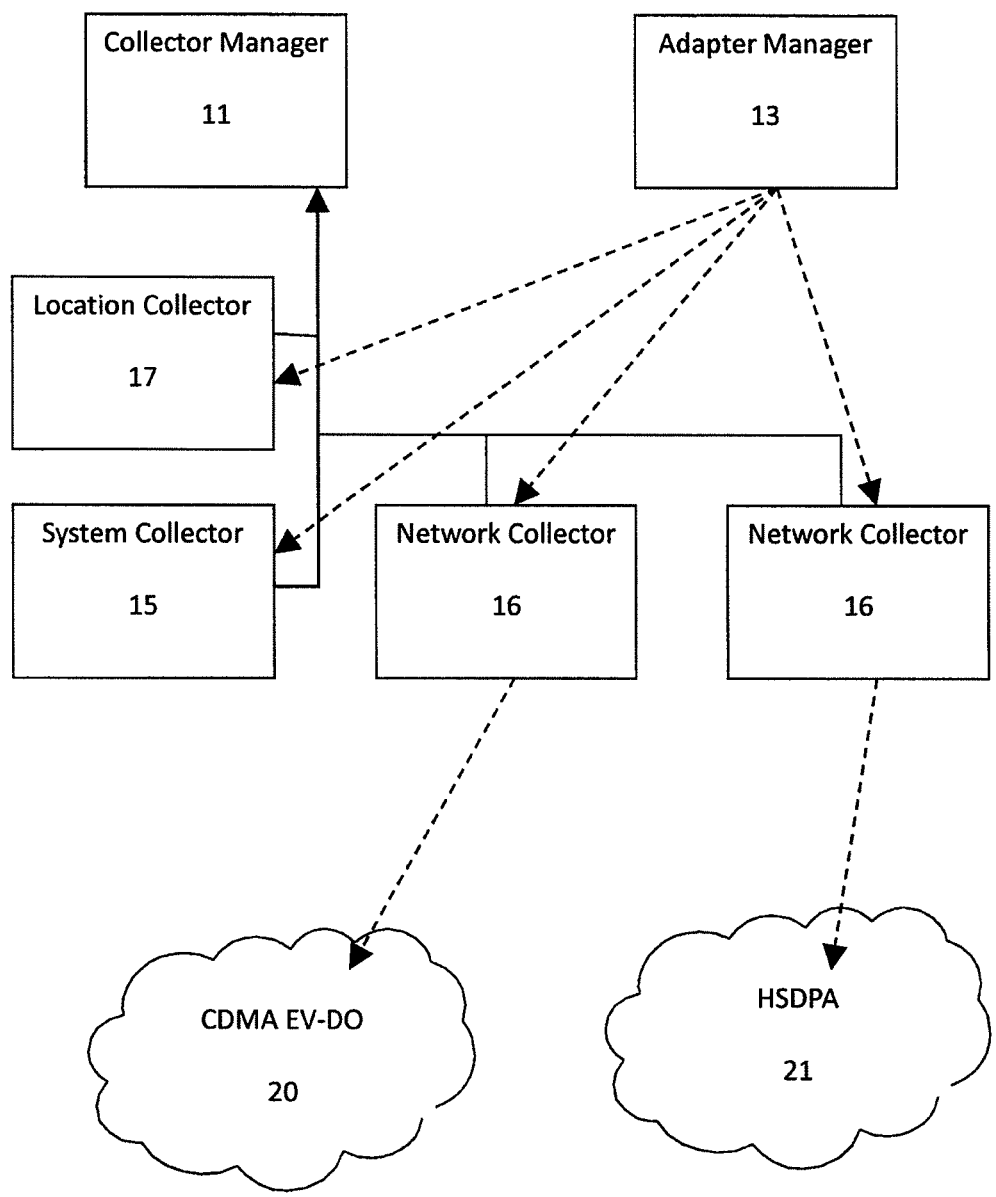
FIG. 3 illustrates, in one exemplary embodiment, a data collection agent monitoring more than one network simultaneously.

The present invention is capable of monitoring multiple networks simultaneously by creating multiple Network Collector 16 entities. In one exemplary embodiment, the present invention is deployed on a multiprocessor Microsoft Server 2008 (R2) platform yielding true simultaneous use of the networks. FIG. 3 shows, by way of non-limiting example, two Network Collector 16 entities simultaneously monitoring two networks including a Code Division Multiple Access Evolved Data Optimized (CDMA EV-DO) 20 network and a High Speed Downlink Packet Access (HSDPA) 21 network.

The present invention is capable of continuing to collect data measurements even when the Mobile Device is not connected to an active network or is only intermittently connected to an active network. Data will continue to be collected from all available collectors until the device is connected to an active network, at which time it will be transmitted.

By way of non-limiting example, on every Mobile Device 1, for each collector identified by the Adapter Manager 13, the system, location and network data can be aggregated by Collector Manager 11 and queued in Data Storage Manager 14. The queued data can then sent by Transmission Manager 12 at specified intervals to Web Server 6. If Mobile Device 1 is not connected to an active network at the end of such an interval, the data can continue to be stored in Data Storage Manager 14 until such time as an active network connection is detected. At that time, all accumulated data may be transmitted to Web Server 6, through either a Wireless Network 4, 5, or another network interface, such as a WLAN or LAN connection. The Collection Manager 11 continues to accept data from each collector, whether Mobile Device 1 is connected to a network or not.

While the present invention is not limited to wireless networks and mobile terminal nodes of the network, this environment provides striking advantages. However, in a network environment with mobile terminal nodes, some new challenges arise.

One of the unique challenges that arise from the application of the present invention to public wireless networks and mobile terminal nodes is the lack of data uniformity that can arise from variations in the velocity of the mobile terminal nodes.

If a Mobile Device 1 collects data at a constant rate regardless of the velocity of the Mobile Device 1, then it will collect more data points over the same geographical region when it is travelling slowly than when it is travelling quickly. And in many applications of the collected data, a more uniform geographic distribution of the collected data is more desirable. By way of non-limiting example, if the collected data were used to generate a coverage map of relative signal strength across a geographic region, then a uniform distribution of data would yield a more accurate coverage map than a geographic distribution of data with areas of dense data points where the Mobile Devices 1 were travelling slowly and more sparse data points where the Mobile Devices 1 where travelling quickly.

Figure 4:
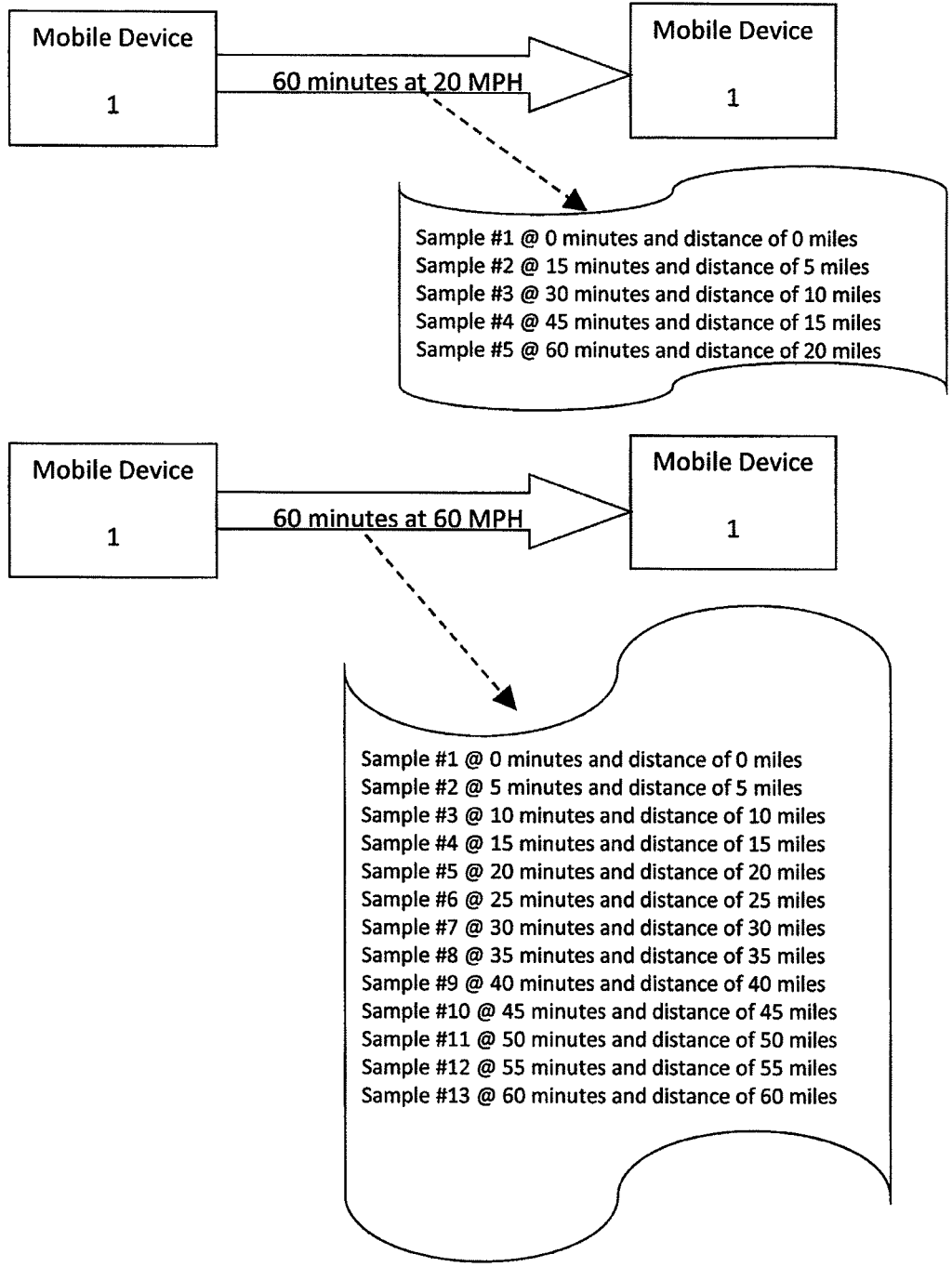
FIG. 4 illustrates an exemplary embodiment of a data collection agent varying the data collection rate in correlation to the velocity of the mobile device.

Therefore, the present invention has the capability to vary the data collection rate in accordance with the velocity of the Mobile Device 1. FIG. 4 shows a Mobile Device 1 travelling for 60 minutes at 20 MPH and collecting 5 samples during that time. FIG. 4 also shows a Mobile Device 1 travelling also for 60 minutes but at a rate of 60 MPH. In this second example, 13 samples were taken. In an exemplary embodiment, a variable sampling rate, proportional to vehicle velocity, can be used to produce representative samples for a given area regardless of the speed of the devices traveling through it. Devices that are traveling at higher speeds would have a higher sampling rate than those moving more slowly. A minimum sampling rate can be used for devices that are stationary or are moving very slowly.

Another unique challenge that arises from the application of the present invention to public wireless networks and mobile terminal nodes is the need to minimize the use of network overhead. The cost of using a public wireless networks is generally directly related to the amount of data transmitted over the network. Therefore, a strong need exists to minimize the amount of network bandwidth consumed by a system intended to monitor the performance of the network.

One method employed by the present invention is to apply the Douglas-Peucker reduction algorithm to many different types of data points collected over time.

The Douglas-Peucker reduction algorithm is a polyline simplification algorithm. In other words, it smoothes out a line, within a specified tolerance level, so that a close approximation of the line can be retained while eliminating many of the individual data points comprising that line. Almost all data values collected over time can be graphed on an X-Y graph with the X axis being time and the Y axis being the value of the data. Therefore, the Douglas-Peucker reduction algorithm can be applied to such a graph maintaining a close approximation of the data value over time with a vast reduction in the actual collected values over time.

Figure 5:
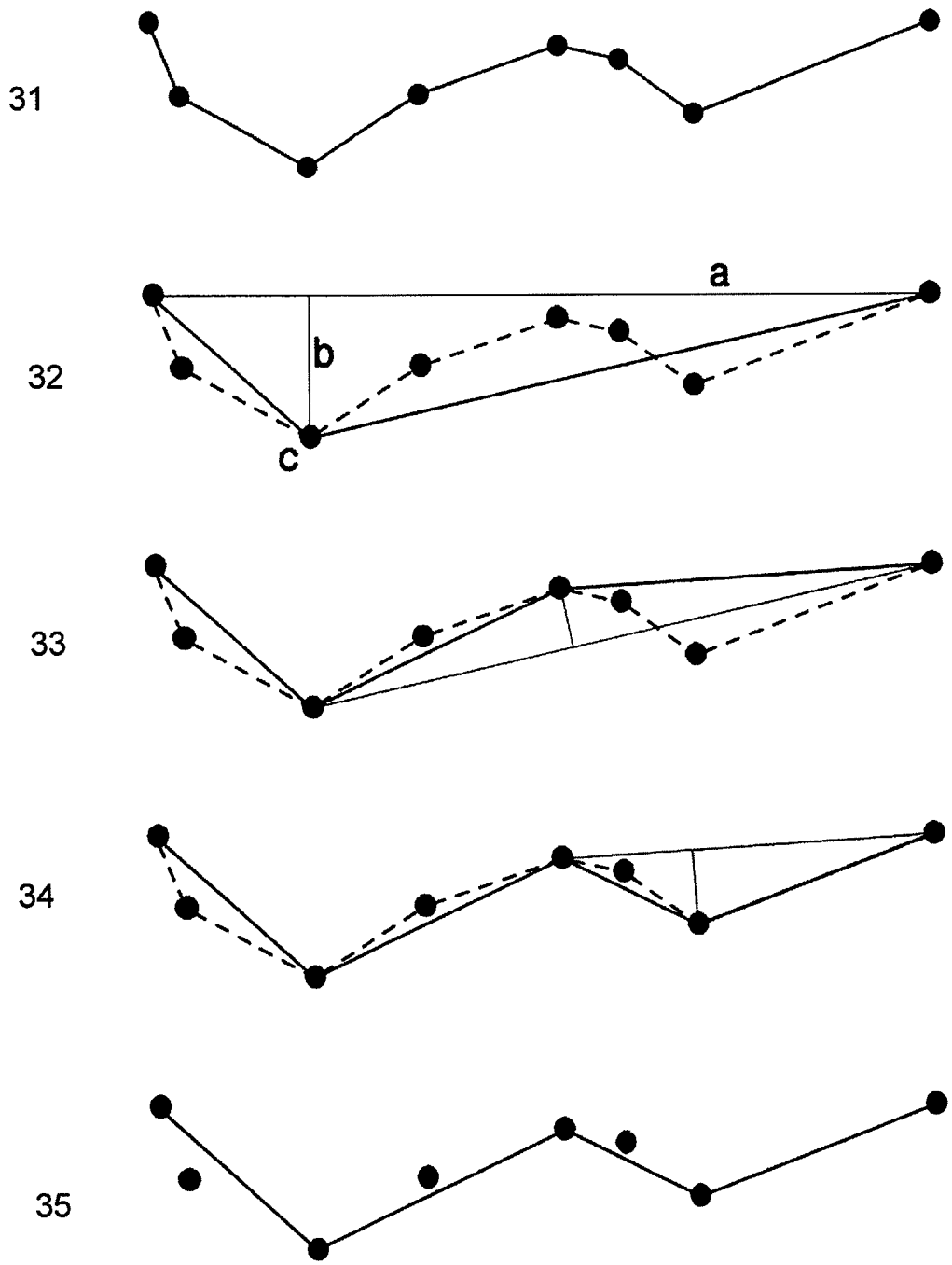
FIG. 5 illustrates an exemplary embodiment of a data series over time being compressed using the Douglas-Peucker reduction algorithm.
Figure 6:
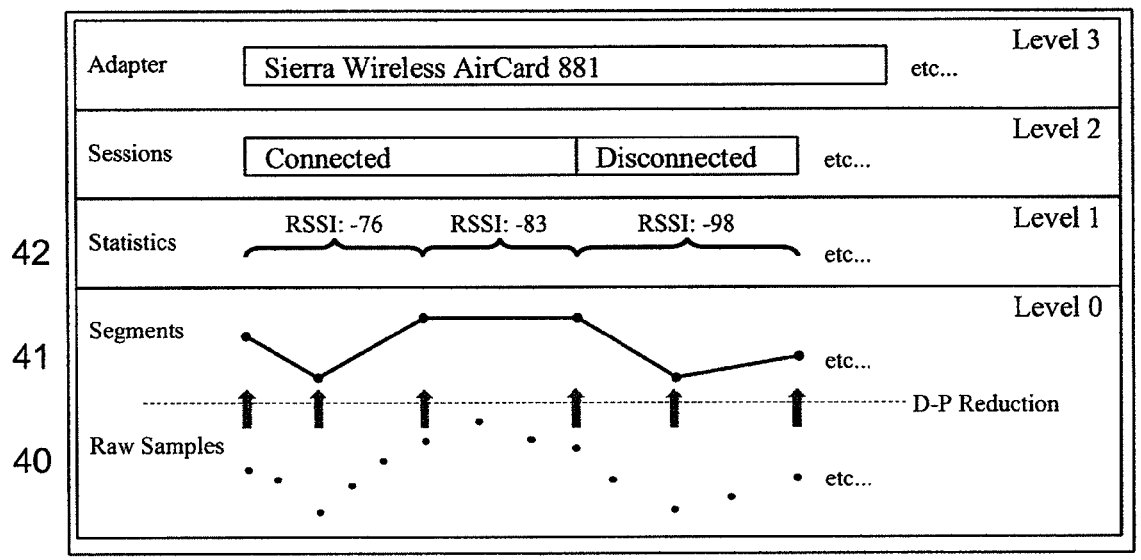
FIG. 6 illustrates an exemplary embodiment of a specific data element (RSSI) over time being compressed using the Douglas-Peucker reduction algorithm.

FIG. 5 shows the concept of the Douglas Peucker reduction algorithm and FIG. 6 shows the Douglas-Peucker reduction algorithm applied to the signal strength data measurement of a wireless network over time.

In Douglas-Peucker reduction, a polyline is processed recursively. On each pass, the endpoints of the line are connected and the distance between each remaining point on the line and the new line connecting the endpoints is calculated. If the distance of the furthest point is less than the specified tolerance value, then the remaining data points are discarded. Otherwise, the furthest point becomes a new vertex, new lines are drawn from it to the original endpoints, and the distance versus tolerance values are recalculated for all remaining points on the new lines. This process continues recursively until all points are within tolerance and have either been eliminated or have been made into a vertex.

Referring to FIG. 5, graphs 31 through 35 show the evolution of a Douglas-Peucker reduction against a polyline. Graph 31 shows the original polyline with 8 data points. Graph 32 shows the first iteration of the Douglas-Peucker reduction algorithm with a line being drawn between the two endpoints, the furthest point from the new line identified, and new lines being drawn to the new vertex. Graph 33 shows the second iteration in which the first segment created in graph 32 is within tolerance and the second data point in the line discarded and in which the second segment created in graph 32 has a furthest point that is out of tolerance. So a new vertex is created on the polyline. Graph 34 shows the third iteration which results in a new vertex. Graph 35 shows the final resulting line which is a close approximation of the original line but with three of the original eight data points eliminated.

Douglas-Peucker reduction can be applied to any scalar data measurement taken over time since such measurements can be translated into an XY line graph. By way of non-limiting example, some of the data elements for which Douglas-Peucker reduction is applicable include: Received Signal Strength Indication (RSSI), battery remaining, geographic location, data xmit/recv rates, error rates, temperature, among others.

Referring to FIG. 6, the application of the Douglas-Peucker reduction algorithm is demonstrated for the signal strength data measurement that a Mobile Device 1 experiences for a wireless network over time. Line 40 shows all of the individual RSSI measurements taken over time. Line 41 shows the line resulting from Douglas-Peucker reduction with the arrows between Line 40 and Line 41 showing the points that were retained in the Douglas-Peucker reduction. All of the original data measurements without corresponding arrows between line 40 and line 41 were discarded in the Douglas-Peucker reduction. Finally, line 42 shows the polyline translated back into the minimal subset of raw measurements required to reproduce the original trend-line of data measurements with high accuracy.

Another unique challenge that arises from the environment of the present invention is the mitigation of privacy concerns. Since the present invention collects data on end-user devices and since the present invention collects location information, both the end-users and the enterprise administrators may want to limit the amount and types of data collected so as to ensure end-user privacy. The present invention has the ability to disable the collection of data elements that might lead to end-user identification. Such data elements include location, IP Address, User Name, and Device Name, among others. By way of non-limiting example, the ability to control the collection of these data elements may be applied by device identity, geographic location, hour of day, and day of week among others.

Referring to FIG. 2, the User Interface 18 of the data collection agent 9 on the Mobile Device 1 may be comprised of a graphical user interface offering the ability to get and set configuration settings that control the behavior of the data collection agents. It is also contemplated that one ordinarily skilled in the art may use a User Interface 18 that include a configuration file. FIG. 7 shows an exemplary embodiment of such a configuration file. In the configuration file, there are settings for enabling/disabling the data collection, enabling/disabling anonymous data collection, enabling/disabling location data collection, enabling/disabling public wireless network data collection, controlling the data collection rate, controlling the tolerance for the Douglas-Peucker reduction algorithm, controlling local data storage behavior, controlling access to the GPS devices, and specifying the manner in which to connect to the Web Server 6.

Figure 8:
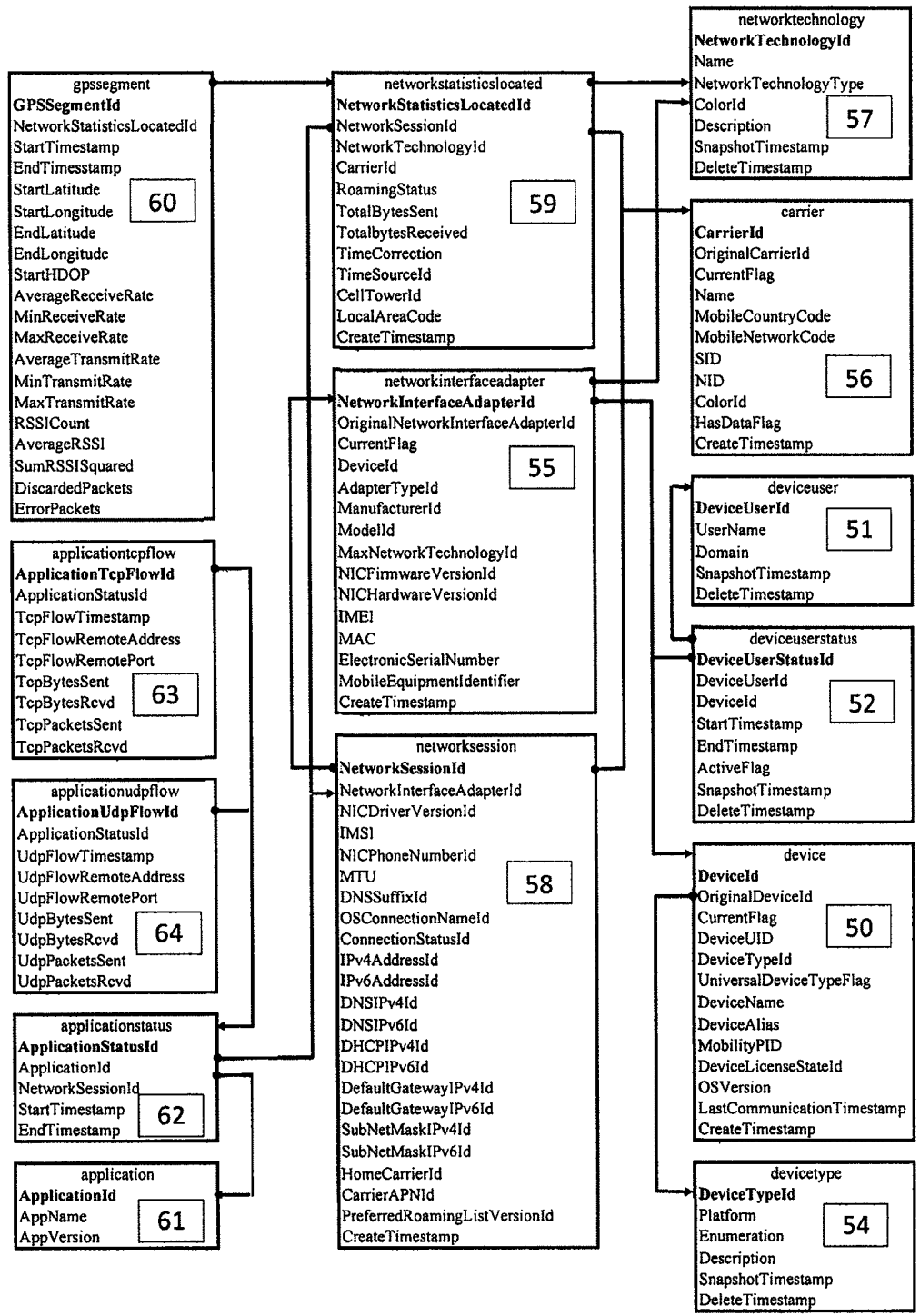
FIG. 8 illustrates, in one exemplary embodiment, the correlated data elements collected by the data collection agents and stored in the central data repository.

All of the data collection agents on the Mobile Devices 1 periodically send all collected data, in compressed form, to the Web Server 6. The primary responsibility of the Web Server 6 is to ensure that the data is reliably stored in the Database 7. The Database 7 is the entity in the present invention that is responsible for storing all historical data collected by the data collection agents, correlating that data, and making it available to the rest of the system for later retrieval. In one embodiment, the Database 7 may be implemented as an object oriented database, but can also be implemented as a relational database or any other type of database. By way of non-limiting example, FIG. 8 shows an exemplary database entity-relationship diagram for a relational database implementation of the Database 7. Referring to FIG. 8, box 50 is an exemplary table where each record describes a Mobile Device 1. As such, it contains columns representing, e.g., Device Name and a unique identifier among others. By way of non-limiting example, the unique identifier may take the form of a universally unique identifier (UUID). Box 51 is the deviceuser table where each record represents a user that has logged onto a Mobile Device 1. The records in this table contain columns such as username and a unique identifier among others. The device table 50 and the deviceuser table 51 are both related to the deviceuserstatus table 52. The deviceuserstatus table is a historical record of each time any deviceuser has logged onto any device. As such, it maintains timestamps as well as references to the device table 50 and the deviceuser table 51 among other columns. The device table 50 is also related to the devicetype table 54 which serves to categorize records in the device table 50 into groups of similar hardware and software platforms. By way of non-limiting example, device types may include laptops, smartphones, handhelds, workstations, among others. The device table 50 is also related to the network interface adapter table 55. Each record in the network interface adapter table 55 represents a networking device that may be used by a particular Mobile Device 1 over a particular period of time and therefore contains columns such as timestamps, references to records from the device table 58, and various characteristics of the networking device such as manufacturer and firmware version among others. The network interface adapter table 55 also relates to the network technology table 57. The network technology table 57 contains records that describe types of network technologies used by cards to access public wireless networks. By way of non-limiting example, network technology types may include HSDPA, CDMA EV-DO, and GPRS among others. The network interface adapter table 55 relates to the network technology table 57 record that represents the highest technology type of which the network interface adapter record is capable. Records in the networksession table 58 represent the discrete periods of time bounded by the time that a network interface card connected to a network and the time that it disconnected from that network. All network and location measurements taken by a data collector must, by definition, fall within the bounds of a networksession 58. Related to the networksession 58 records, are the networkstatisticslocated 59 records. These records contain statistical information for a discrete sub-period of time within a networksession 58. These record types contain references back to the associated networksession records, timestamps, network carrier identifiers, and transmit and receive byte counts, among others. The carrier references in these records refer to the carrier table 56. The carrier table 56 represents a particular network provider and contains identifying information about that carrier. By way of non-limiting example, the carrier table 52 may contain a NID and SID value for a CDMA network or it may contain a MCC and MNC value for GSM networks. The networkstatisticslocated 59 table is also related to the gpssegment 60 table. Whenever network measurements are collected, any location data that can be correlated with the collected data are added to the gpssegment 60 table. The network session table 58 is also related to the ApplicationStatus table 62. Each record in the ApplicationStatus table 62 represents an instance of a running application. As such, each record contains a start time and an end time. Each record also contains a reference to the Application table 61. The application table 61 contains a record for each unique combination of application name and version in the system. Also related to the ApplicationStatus 62 table, are the ApplicationTcpFlow 63 and ApplicationUdpFlow 64 tables. These tables represent snapshots in time of traffic statistics between two endpoints by a particular application. Therefore, each of these records refers to a record in the ApplicationStatus table 62. Each also contains the IP address and port of the remote endpoint as well as byte and packet counts sent and received between the two endpoints during the time period represented by the current record. Periodically, the database 7 must purge its oldest data in order to control maximum resource consumption. In one embodiment, this may be performed on-demand by a system administrator. In an alternate embodiment, the system administrator may configure this to occur automatically according to a configured schedule.

Figure 9:
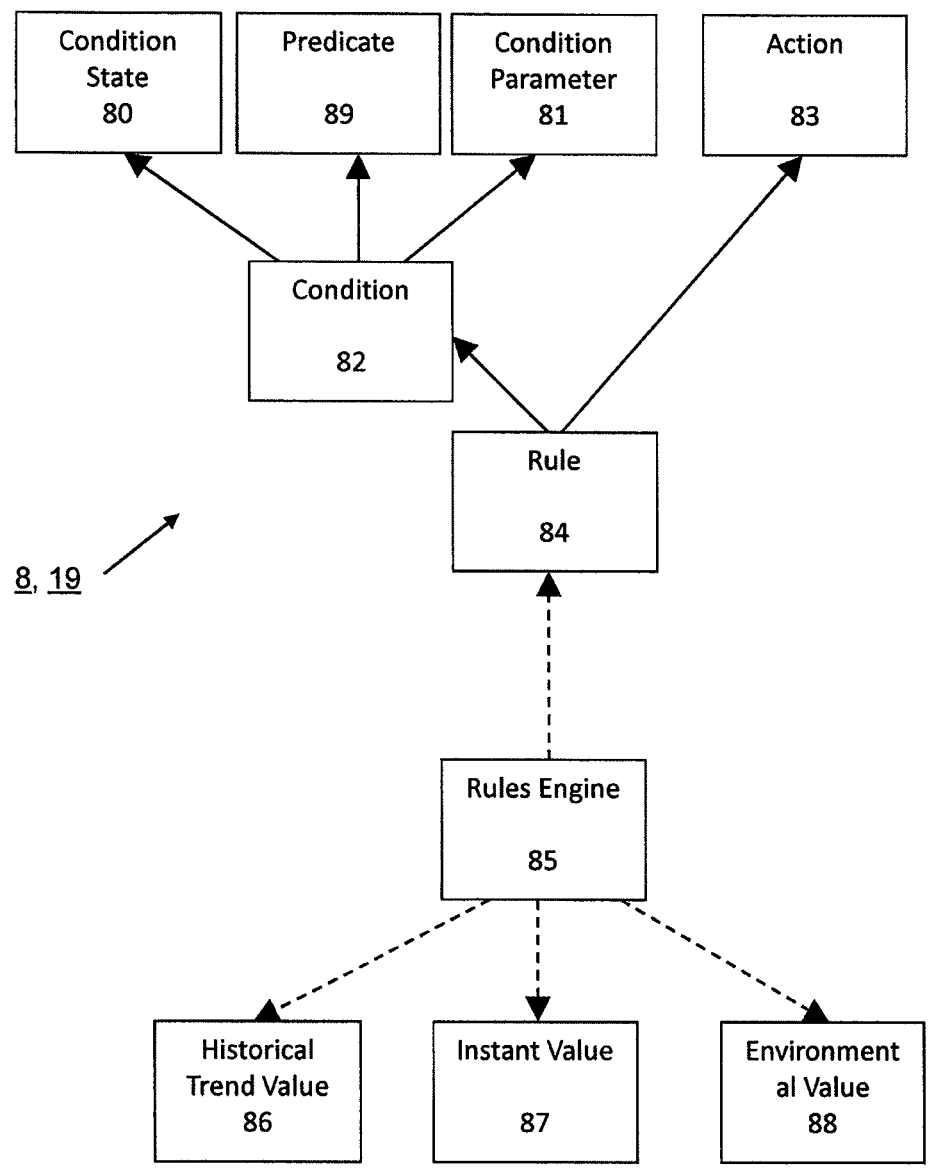
FIG. 9 illustrates, in one exemplary embodiment, a block diagram of an artificial intelligence engine that evaluates environmental conditions, data collection instant values, and data collection trends.

Both the Mobile Device 1 and the Web Server 6 may contain an Artificial Intelligence engine 8, 19, respectively, which is described with the block diagram in FIG. 9. The Artificial Intelligence Engine 8, 19 is configured with a series of Rules 84. Rules 84 are composed of one or more Conditions 82 and one or more Actions 83. Conditions 82 are composed of one or more Predicates 89, zero or more Condition Parameters 81 and one or more Condition States 80. By way of non-limiting example, the conditions may be evaluated by the Rules Engine 85 applying Rule(s) 84 against Instant Values 86 of data measurements, Historical Trend Values 86 of collected data, Environmental Values 88 or a combination thereof.

When the Rules Engine 85 starts, it first reads all configured rules. In one exemplary embodiment, the rules may be retrieved over the network from a database or other network service. In another exemplary embodiment, the rules may be configured in a configuration file controlled on either Mobile Device 1 or downloaded to the Mobile Device 1 as needed from Server 6. By way of non-limiting example, an exemplary configuration file is shown in FIGS. 10A and 10B depicted in XML format. In FIG. 10A, there are a series of Action 90 elements. Action 90 elements describe actions that may be taken when the Conditions 82 and Predicates 89 evaluate to true. By way of non-limiting example, FIG. 10A shows an Action 90 element that contains an Action of type "SMTP". This type of action causes an email message to be sent. Following the Action 90 elements, the configuration file of FIG. 10A shows a series of Predicate 92 elements. Predicates 92 are used to qualify a Condition 93 but are not full Conditions 93 themselves. Next in the file, the Conditions 93 are listed. Conditions 93 contain both Configuration parameters and State parameters. Configuration parameters are specified when the rule is created. State parameters values are set when a Condition 93 is evaluated by the Rules Engine 85 (FIG. 9). Finally, after the Conditions 93, the configuration file in FIG. 10B lists a series of Rules 94. Rules 94 are comprised of a series of references to Conditions 93 and Actions 90. Rules 94 are also configured with Trigger and Reset messages each of which may contain state or configuration parameter values from any of the referenced Conditions 93.

Conditions 82 and Predicates 89 represent the evaluation side of the rules engine 85. Actions 83 represent what happens after evaluation completes. Conditions 82 are primitives in the present invention that can accept input parameters and produce output parameters. By way of non-limiting example, various examples of Conditions 82 are listed in FIG. 11. The first example describes a condition that evaluates to true if a Mobile Device 1 has not successfully communicated with the Web Server 6 within a configurable number of minutes. By way of non-limiting example, the artificial intelligence engine 8 in the data collection agent 9 on the Mobile Device 1 may use this condition in a rule that reconfigures the data collection interval on the present invention to collect data more rapidly. Such a reconfiguration based on real-time feedback may aid troubleshooting by providing more dense data collection in problem hot-spots. Also by way of non-limiting example, the artificial intelligence engine 19 on the Web Server 6 may use this condition in a rule that sends an SMTP message to a system administrator. Other Conditions are described by way of non-limiting example in FIG. 11 including Conditions 82 to assist with troubleshooting applications running on the Mobile Device 1, managing over and under utilization of devices and public network usage plans, detecting problems in the performance of the public network, and detecting usage patterns of company resources.

Sometimes the data set against which conditions are evaluated should be limited. This is the purpose of Predicates 89. Non-limiting examples of predicates used in the present invention are listed in FIG. 12. Using the example Predicates 89 in FIG. 12, the evaluation of Conditions 82 can be limited to specific users, Mobile Devices 1, groups of users and Mobile Devices 1, devices using network interfaces with specific phone numbers, devices operating in a defined geographic area, devices with particular attributes or using network interface devices with particular attributes, specific days of the week or times of the day, or devices experiencing specific operating environments such as a signal strength above or below a particular threshold for a particular period of time.

Actions 83 are taken based on the evaluation of Conditions 82 and Predicates 89. Actions 83 are executed when Conditions evaluate to true. Actions 83 may be stateful, meaning that they execute both when the conditions and predicates evaluate to true, and then again when they subsequently evaluate to false. Such stateful Actions 83, only trigger when the evaluation state transitions from true to false or from false to true.

By way of non-limiting example, FIG. 13 describes some examples of the types of Actions 83 that are part of the present invention. Actions 83 of type SMTP send email messages. This type of Action 83 is configured with the IP Address and Port of the SMTP server as well as the "To" and "From" address, subject line, message, and any additional attachments to the email message. Actions 83 of type SMTP can also be used to send SMS messages through the SMS gateways of most major public network carriers. Actions 83 of type SNMP send a trap to a management station and are configured with the ip address and port of the management station, the community string, and the OID of the trap. Actions 83 of type ModifySystem are used to modify the configuration of the local operating environment in which the present invention is operating. Actions 83 of this type are configured with the key of the setting to change and the value to which the setting should be changed. By way of non-limiting example, this Action 83 may be used to modify the Windows Registry. Actions 83 of type ModifyConfig are used to modify the run-time configuration of the present invention. Actions 83 of this type are also configured with the key of the setting to change and the value to which the setting should be changed. By way of non-limiting example, if a condition evaluated to indicate that a Mobile Device 1 was experiencing network trouble, this Action 83 may be used to increase the data collection frequency in an effort to gather more data about the problem. Actions 83 of type ToggleRule are used to enable or disable other artificial intelligence Rules 84 and are simply configured with the identifier of the Rule 84 to be acted upon. Actions 83 of this type can be used to create complex chains of rules. Another example of a Action 83 type in the present invention is LaunchProcess. Actions 83 of this type are used to launch additional processes on the local system and are configured with the path to the image to launch, the image name, and any additional parameters to be supplied to the process. When rules are configured, the values for the configuration parameters of Action 83 may be overridden and replaced with the values of the Condition State 80 variables of conditions contained in the currently configured rule. An example of this is shown in FIG. 10, 94 with the subject line being dynamically generated from a format string and the "deviceName" state variable of a referenced condition of the rule.

Once the Rules Engine 85 (FIG. 9) determines the currently configured set of Rules 84, it creates instances of Condition objects. Condition objects are supplied with any configured input parameters when they are created as well as interfaces to acquire the inputs for Historical Trend Values 86, Instant Values 87, and Environmental Values 88. In one exemplary embodiment of the present invention, the interface for Historical Trend Values 86 represents an interface to the historical Database 7. In another exemplary embodiment of the present invention, the interface for Historical Trend Values 86 represents in interface to the local data storage for data that has not yet been sent by the Mobile Device 1 to the Web Server 6. In yet another exemplary embodiment, the interface for Historical Trend Values 86 may be null. A null interface would mean that those input values are disabled and any artificial intelligence rule that requires such inputs will result in error. This may be useful when the Artificial Intelligence engine 8 is on the Mobile Device 1 and network usage concerns preclude using database input in Condition and Predicate evaluation. Instant values may be derived from the current data collection cycle on the Mobile Device 1 or from incoming messages from Mobile Devices 1 on the Web Server 6. Environmental Conditions may be derived from the system data collector 15, incoming messages from Mobile Devices 1 on the Web Server, or directly from the operating system itself.

Then, on the configured interval, the Rules Engine 85 will iterate through the configured Rules 84 requesting that each one evaluate all contained Predicates 89 and Conditions 82. The Rules Engine 85 then proceeds to fire any Actions 83 when the Conditions 82 and Predicates 89 evaluate to true or when the rule is stateful and the Conditions 82 and Predicates 89 evaluate back to false after having previously evaluated to true.

The Artificial Intelligence engine 8, 19 has the ability to interact with other systems through some of its Actions 83 to create additional value. For example, the ModifyOS and LaunchProcess Actions 83 can both be used to interact with systems as described in, e.g., U.S. Pat. Nos. 7,778,260, 7,602,782, 7,574,208, 7,346,370, 7,136,645, 6,981,047, 6,826,405, 6,418,324, 6,347,340, 6,198,920, 6,193,152, U.S. Patent Application Publication Nos. US2010/0046436, US2009/0307522, US2009/0083835, US2007/0206591, US2006/0203804, US2006/0187956, US2006/0146825, US20060046716, US2006/0023676, US2006/0009213, US2005/0237982, US2005/0002419, US2004/0264402, US2004/0170181, US2003/0017845, US2005/0223115, US2005/0223114, US2003/0120811, and US2002/0122394, the disclosures of which are expressly incorporated by reference herein in their entireties. In this manner, users can be allowed to dynamically and automatically control the behavior of their Mobile VPN and Policy Management systems according to instant data measurements, data measurement trends, and environmental conditions.

All of the data measurements that are collected by the data collection agents 9 on the Mobile Devices 1 are periodically sent to the Web Server 6 to be stored in the Database 7. The Database 7 stores all of the historical data measurements in a correlated data model. One exemplary embodiment of the correlated data model is shown in FIG. 8. The present invention makes all of the historical data measurements stored in the Database 7 available for analysis through a series of business intelligence reports.

Business Intelligence reports are provided to analyze business concerns. By way of non-limiting example, some of the business concerns that can be addressed by applying analysis to the correlated data capture from data collection agents on Mobile Devices 1 in the present invention include monitoring the actual and predicted cost of public network use by a population of Mobile Devices 1, analyzing the productivity of a population of Mobile Devices 1, and managing the inventory of Mobile Devices 1 and their associated network interface devices. Additional non-limiting examples include geographical maps with overlays of the collected data. By way of non-limiting example, the present invention can provide overlays of the locations of Mobile Devices 1 over time and the reported signal strength and other performance measures of public networks over space and time. In addition, the present invention provides for data correlation between the geographical maps and the business intelligence reports such that each may be filtered by the data elements comprising the other. In accordance with embodiments, various business intelligence tools, such as those available from QlikTech (QlikView) and Microsoft (BING Maps) can be utilized in their 'off-the-shelf' state to plot, display and analyze the data collected by the participating Mobile Devices 1 of the disclosed system and method. Further, this information can be combined in accordance with an exemplary embodiment to interchange filtering information thereby enhancing the applicability and value of the displayed information.

Figure 14:
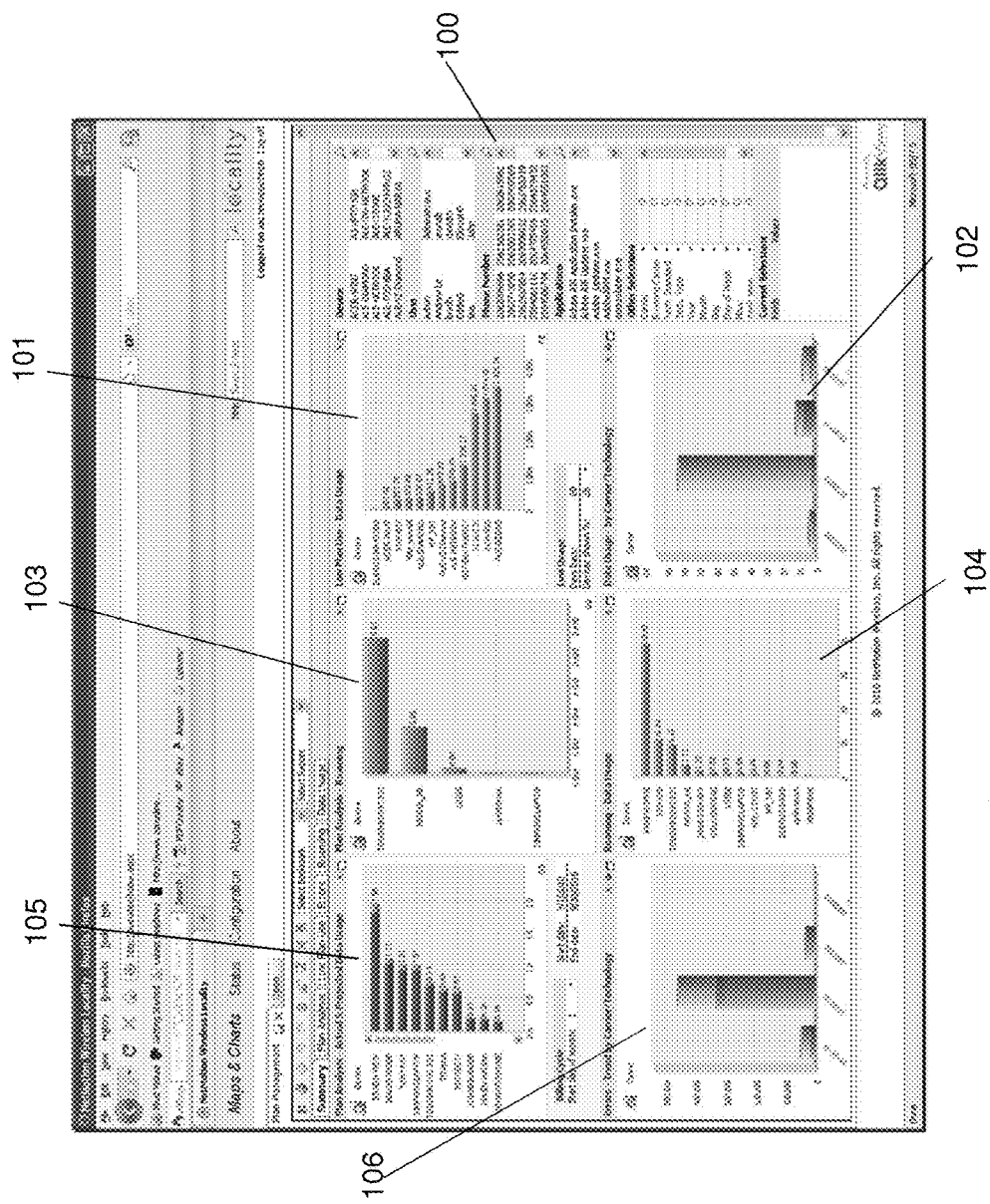
FIG. 14 illustrates, in one exemplary embodiment, a business intelligence report, derived from the data elements collected by the data collection agents over time and location that provides insight into actual data activity and predicted carrier billing levels.

By way of non-limiting example, FIG. 14 shows an exemplary business intelligence report to analyze public wireless network plan use among a population of Mobile Devices 1. In this report, Filters 100 allow the reports to show only information that pertains to particular devices, users, phone numbers, applications, among others. Chart 101 shows Mobile Devices 1 that have under-utilized their public wireless network plan. Chart 102 shows a distribution of network use across all public network carriers in use by the Mobile Device 1 population. Charts 103 and 104 both show the amount of network use by Mobile Device 1 while using a network interface that was roaming and possibly incurring additional charges. Chart 105 shows actual and projected data usage by Mobile Device 1. And Chart 106 shows the amount of network errors encountered by the population of Mobile Devices 1.

Figure 15:
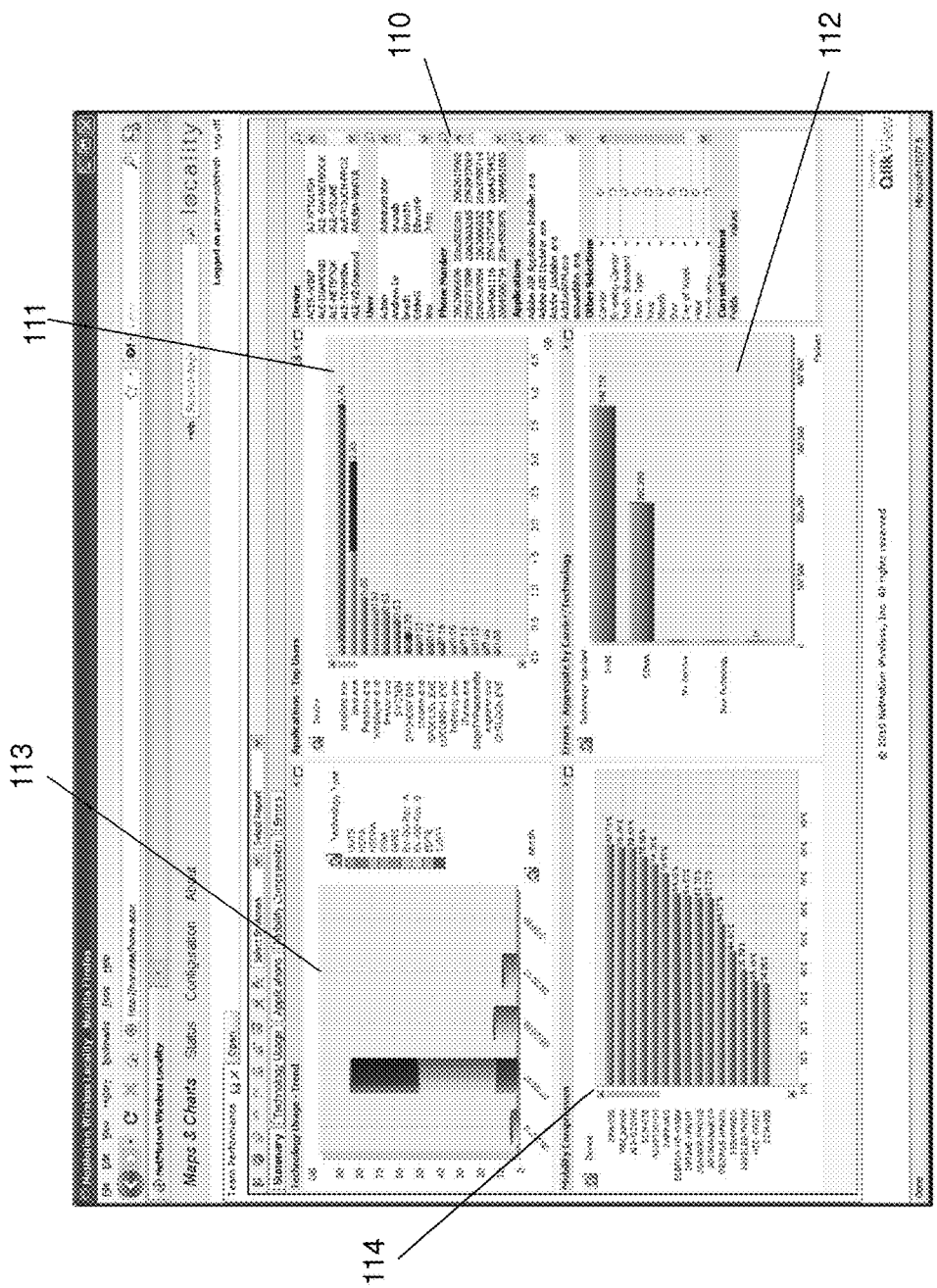
FIG. 15 illustrates, in one exemplary embodiment, a business intelligence report, derived from the data elements collected by the data collection agents over time and location that provides insight into the productivity performance of a population of mobile devices.

Also by way of non-limiting example, FIG. 15 shows an exemplary business intelligence report to analyze the productivity of a population of Mobile Devices 1. In this report, Filters 110 allow the reports to show only information that pertains to particular devices, users, phone numbers, applications, among others. Chart 111 shows the applications that were most in use. Chart 112 shows the amount of network errors that are occurring by carrier. Chart 113 shows the trend over time of network technology use by the population of Mobile Devices 1. And Chart 114 shows the amount of compression that the Mobile Devices are experiencing with their VPN provider.

Figure 16:
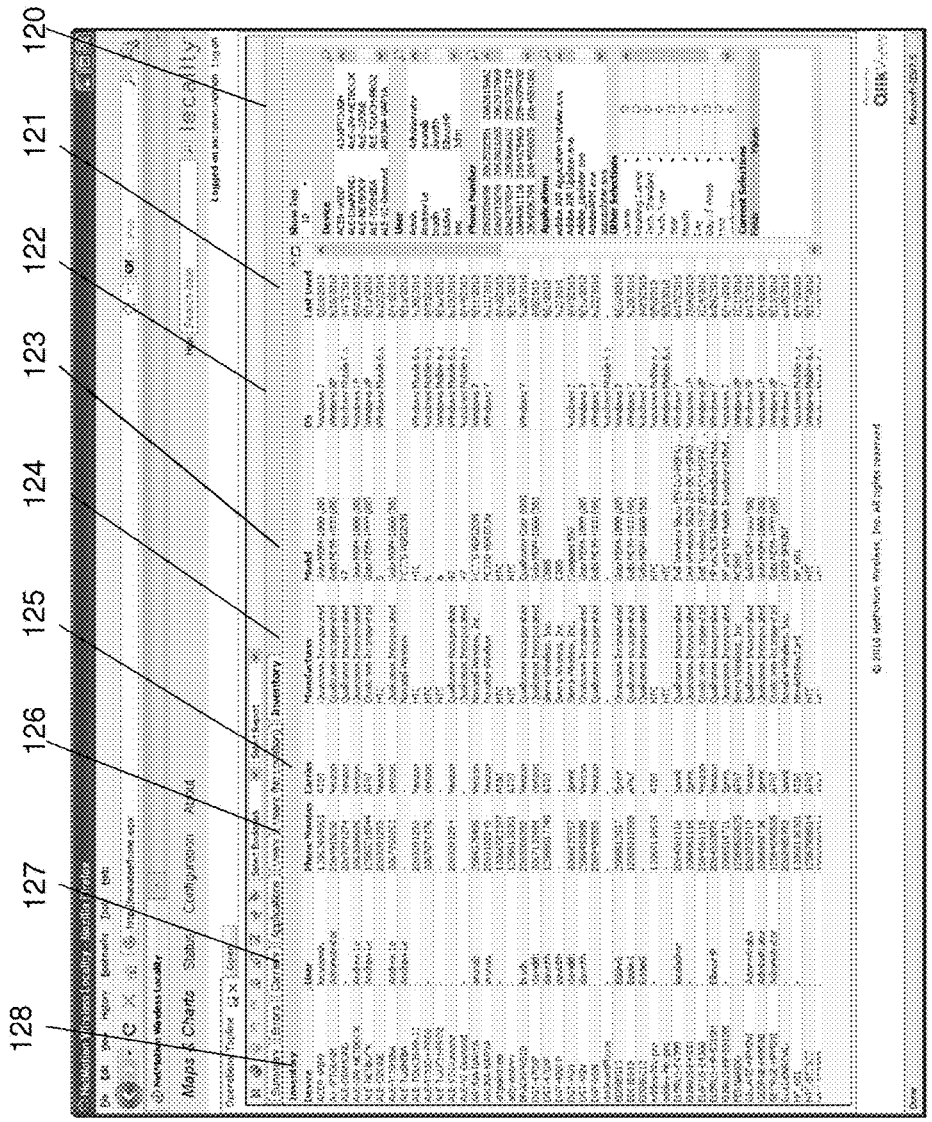
FIG. 16 illustrates, in one exemplary embodiment, a business intelligence report, derived from the data elements collected by the data collection agents over time and location that provides insight into managing the asset inventory of a population of mobile devices.

Also by way of non-limiting example, FIG. 16 shows an exemplary business intelligence report to manage the equipment inventory for a mobile device population. In this report, Filters 120 allow the reports to show only information that pertains to particular devices, users, phone numbers, applications, among others. This report is a table with Columns for Device Name 128, User Name 127, Phone Number 126, Carrier 125, Manufacturer 124, Model 123, Operating System 122, and Last Used Timestamp 121.

Figure 17:
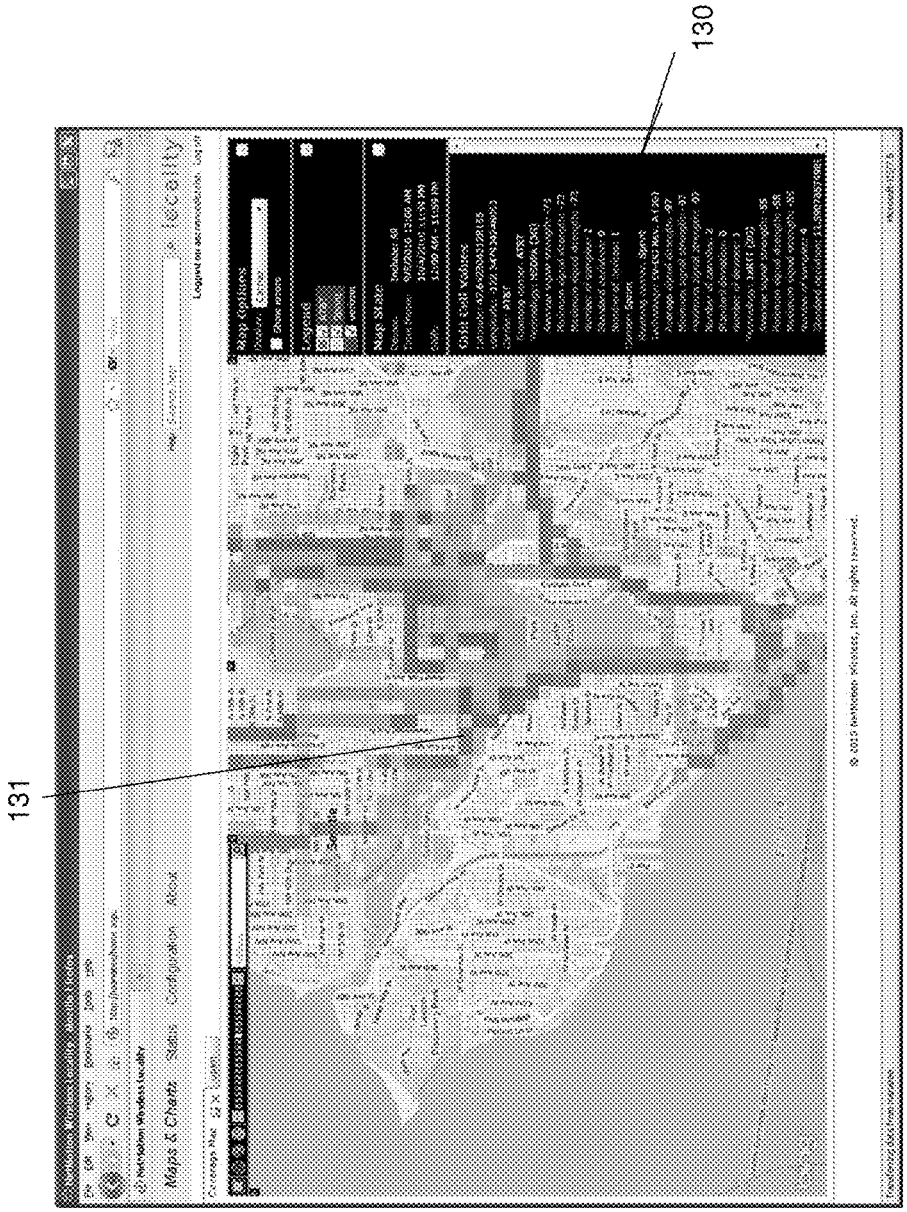
FIG. 17 illustrates, in one exemplary embodiment, a business intelligence report, derived from the data elements collected by the data collection agents over time and location that provides insight into the performance of wireless networks over space and time.

Also by way of non-limiting example, FIG. 17 shows an exemplary geographical report with data overlay showing information like carrier name and signal strength over space and time. Filters 130 allow the reports to show only information that pertains to particular devices, users, phone numbers, applications, among others. The performance data is plotted over the geographical map as indicated in 131.

Figure 18:
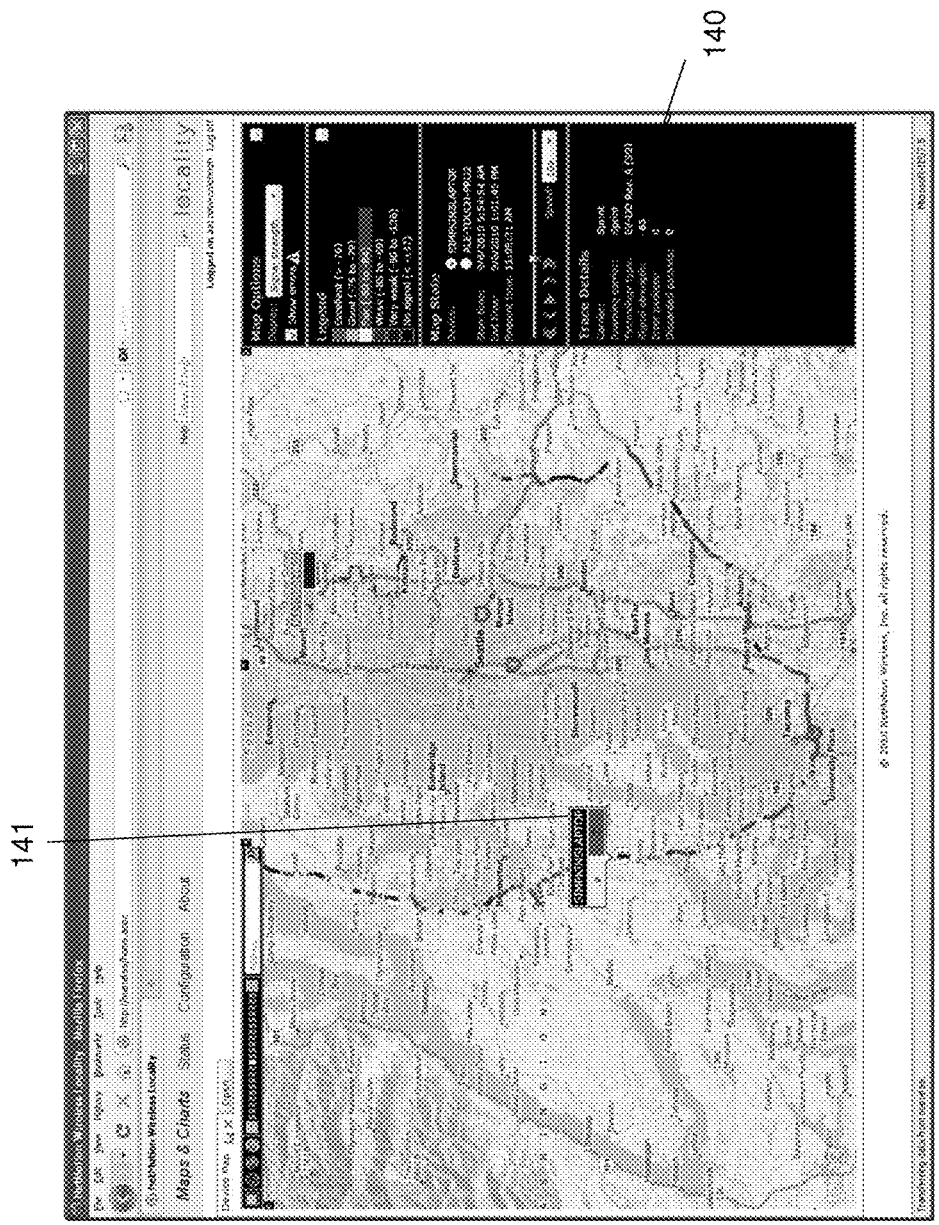
FIG. 18 illustrates, in one exemplary embodiment, a business intelligence report, derived from the data elements collected by the data collection agents over time and location that provides insight into the location of a set of Mobile Devices over time.

Also by way of non-limiting example, FIG. 18 shows an exemplary geographical report with data overlay showing the location of a Mobile Device over time. Filters 140 allow the reports to show only information that pertains to particular devices, users, phone numbers, applications, among others. The device location as well as the network performance experienced by the device along its route is plotted over the geographical map as indicated in 141.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission and wireless networking represent examples of the state of the art. Such standards are periodically superseded by faster or more efficient equivalents having essentially the same functions. Accordingly, replacement standards and protocols having the same functions are considered equivalents.

Moreover, it is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A mobile device tracker for tracking movement of mobile devices within a mobile communications environment, the mobile device tracker comprising:
   an acquisition device to periodically acquire Douglas-Peucker reduction algorithm processed data related to network performance data of the mobile communications environment, which is collected by and stored in a mobile device as it moves within the mobile communications environment;
   a database configured to store the periodically acquired Douglas-Peucker reduction algorithm processed data, the database being configured to purge oldest data to control resource consumption; and
   a plotter to identify the acquired Douglas-Peucker reduction algorithm processed data stored in the database as an approximation of the network performance data monitored by the mobile device on a map of a geographical region within the mobile communications environment, wherein the network performance data includes at least one of received signal strength, data transmit/receive rates, and error rates,
   wherein the periodically acquired Douglas-Peucker reduction algorithm processed data further includes location and time data from the mobile device, and the plotter is additionally structured to connect in chronological order the location data plotted on the map to track movement of the mobile device.

2. The mobile device tracker in accordance with claim 1, wherein the indicia comprises arrows.

3. The mobile device tracker in accordance with claim 1, wherein the location data relates to a location of an attachment point for the mobile device in the mobile communications network.

4. The mobile device tracker in accordance with claim 1, wherein the mobile communications environment comprises a plurality of separate networks, wherein at least one of the plurality of separate networks comprises one of a public and a private mobile network.

5. The mobile device tracker in accordance with claim 4, wherein, regardless of the network to which the mobile device is connected, the acquisition device receives the location data for an attachment point to which the mobile device is connected.

6. The mobile device tracker in accordance with claim 1, wherein the acquisition device automatically receives the Douglas-Peucker reduction algorithm processed data from the mobile device.

7. The mobile device tracker in accordance with claim 1, wherein the mobile communications environment comprises multiple networks, the acquisition device is configured to additionally periodically acquire, with the location data from the mobile device network, performance data for each of a plurality of the multiple networks to which the mobile device is coupled that is associated with the location data, and the plotter is configured to identify with the location data on the geographical region map, the network performance data that is associated with the location data from the mobile device for each of the plurality of multiple networks to which the mobile device is coupled.

8. A method for tracking movement of mobile devices within a mobile communications environment, the method comprising:
   periodically acquiring Douglas-Peucker reduction algorithm processed data related to network performance data of the mobile communications environment, which is collected by and stored in a mobile device as it moves within the mobile communications environment;
   storing the periodically acquired Douglas-Peucker reduction algorithm processed data in a database;
   plotting the acquired Douglas-Peucker reduction algorithm processed data stored in the database as an approximation of the network performance data monitored by the mobile device on a map of a geographical region within the mobile communications environment, wherein the network performance data includes at least one of received signal strength, data transmit/receive rates, and error rates; and
   purging the oldest data stored in the database to control resource consumption,
   wherein the periodically acquired Douglas-Peucker reduction algorithm processed data further includes location and time data from the mobile device, and the method further includes connecting in chronological order the location data plotted on the map to track movement of the mobile device.

9. The method in accordance with claim 8, wherein the indicia comprises arrows.

10. The method in accordance with claim 8, wherein the location data identifies an attachment point for the mobile user in the mobile communications network.

11. The method in accordance with claim 8, wherein the mobile communications environment comprises a plurality of separate networks, wherein at least one of the plurality of separate networks comprises one of a public and a private mobile network.

12. The method in accordance with claim 11, further comprising receiving, regardless of the network to which the mobile device is connected, location data for an attachment point to which the mobile user is connected.

13. The method in accordance with claim 8, further comprising automatically receiving the Douglas-Peucker reduction algorithm processed data from the mobile device.

14. The method in accordance with claim 8, wherein the mobile communications environment comprises multiple networks, and the method further comprises:
   periodically acquiring, with the location data from the mobile device network, performance data that is associated with the location data for each of a plurality of the multiple networks to which the mobile device is coupled; and
   plotting the location data on the geographical region map, the network performance data that is associated with the location data from the mobile device for each of the plurality of multiple networks to which the mobile device is coupled.

15. A mobile device tracker for tracking movement of mobile devices within a mobile communications environment comprising at least one available network, the mobile device tracker comprising:
   an acquisition device to periodically acquire compressed location data and network performance data collected over time and stored in mobile devices, wherein the network performance data includes at least one of received signal strength, data transmit/receive rates, and error rates;
   a storage device for storing the location data and network performance data for each mobile device and a time at which the location data was generated; and
   a mapping device that populates, for at least one specified mobile device, maps of a geographical region within which the mobile communications environment is located with respective location data, network performance data and the generation time,
   wherein the storage device is configured to purge oldest stored data to control resource consumption, and
   wherein the compressed location data and network performance data further includes location and time data from the mobile device, and the plotter is additionally structured to connect in chronological order the location data plotted on the map to track movement of the mobile device.

16. The mobile device tracker in accordance with claim 15, wherein the indicia comprises arrows.

17. The mobile device tracker in accordance with claim 15, wherein the mobile communications environment comprises multiple networks, the acquisition device is configured to additionally periodically acquire, with the location data from the mobile device network, performance data for each of a plurality of the multiple networks to which the mobile device is coupled that is associated with the location data, and the plotter is configured to identify with the location data on the geographical region map, the network performance data that is associated with the location data from the mobile device for each of the plurality of multiple networks to which the mobile device is coupled.

* * * * *